(12) United States Patent
Blair et al.

(10) Patent No.: US 8,224,674 B2
(45) Date of Patent: Jul. 17, 2012

(54) METHOD AND SYSTEM FOR ISSUING INSURANCE UNDERWRITING INSTRUMENTS

(75) Inventors: Bryan Blair, Hampton, MA (US); Jay Burke, Glastonbury, CT (US); Jim Morelewicz, Avon, CT (US); Bob Post, Canton, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 928 days.

(21) Appl. No.: 12/237,616

(22) Filed: Sep. 25, 2008
(Under 37 CFR 1.47)

(65) Prior Publication Data

US 2009/0018874 A1   Jan. 15, 2009

Related U.S. Application Data

(63) Continuation of application No. 09/738,023, filed on Dec. 15, 2000, now Pat. No. 7,430,516.

(60) Provisional application No. 60/171,177, filed on Dec. 16, 1999.

(51) Int. Cl.
*G06Q 40/00* (2006.01)

(52) U.S. Cl. ............... 705/4; 705/36 R; 705/35; 705/37

(58) Field of Classification Search .................. 705/4
See application file for complete search history.

(56) References Cited

U.S. PATENT DOCUMENTS

| | | | |
|---|---|---|---|
| 4,831,526 A | 5/1989 | Luchs et al. | |
| 5,191,522 A | 3/1993 | Bosco et al. | |
| 5,523,942 A | 6/1996 | Tyler et al. | |
| 5,873,066 A | 2/1999 | Underwood et al. | |
| 5,926,792 A | 7/1999 | Koppes et al. | |
| 5,991,733 A | 11/1999 | Aleia et al. | |
| 6,839,689 B2 | 1/2005 | Aieta et al. | |
| 7,194,435 B1 | 3/2007 | Sforzo | |
| 2002/0087364 A1 | 7/2002 | Lerner et al. | |
| 2002/0111835 A1 | 8/2002 | Hele et al. | |

OTHER PUBLICATIONS

Bond trading for the masses by Eric S. Hardy. Forbes. New York: Jun. 14, 1999. vol. 163, Iss. 12; p. 300, 1 pgs.

Cumberland Technologies, Inc. and Peerless Insurance Announce the Formation of a Strategic Alliance; PR Newswire, N. Y; Jul. 7, 1999; pp. 1-2.

The e-Bond Revolution; How the Internet is reshaping the world's largest financial market by Toddi Gutner in New York, Toddi Gutner. Business Week. New York: Nov. 15, 1999; Iss. 3655; p. 270.

*Primary Examiner* — Vanel Frenel
(74) *Attorney, Agent, or Firm* — Howard IP Law Group, PC

(57) ABSTRACT

A method and system for issuing an insurance underwriting instrument using at least one computing processor. The system includes a computer processor and a first and second query-able plurality of memory locations storing data indicative of images of a plurality of forms associated with a particular type of fidelity or surety bond and data indicative of policies respectively. The system further includes a user interface for inputting data indicative of an insurance client and of the fidelity or surety bond. A calculator application is included which automatically calculates a premium for the insurance underwriting instrument based on the input data using the computer processor. The system includes software for selecting a sub-set of the data indicative of the images and software for automatically rendering the bond to be issued using the data of bond customer.

20 Claims, 26 Drawing Sheets

FIG. 3

ISSUE A SURETY BOND - NETSCAPE

FILE EDIT VIEW GO COMMUNICATOR HELP

ISSUE A SURETY BOND
GNSLOB

THE HARTFORD

BACK TO MAIN MENU

HELP

EMAIL

TYPE OF COVERAGE

○ SURETY – CONTRACT BID
○ SURETY – CONTRACT FINAL
○ SURETY – COURT, JUDICIAL
○ SURETY – COURT, PROBATE AND FIDICIARY
○ SURETY – LICENSE & PERMIT
○ SURETY – MISCELLANEOUS
○ SURETY – GOVERNMENT, FEDERAL AND PUBLIC OFFICIAL

} 511

☐ COMMERCIAL SURETY ACCOUNT BUSINESS?

[CONTINUE] [BACK TO MAIN MENU]

510

DOCUMENT: DONE

START | ISSUE A SURETY BOND | 1 STEP SURETY MAIN MENU... | 9:27 AM

FIG. 4a

```
✱BOND SELECTION AND RATING CRITERIA - NETSCAPE                              _ ☐ ☒
FILE EDIT VIEW GO COMMUNICATOR HELP
┌─────────────────────────────────────────────────────────────────────────────┐
│  ☐ ▣ OFFICE ▣☒▣▣▣▣▣▣▣▣▣▣▣▣▣▣▣                              MICROSOFT       │
│  ┌──────────────────────────────────────────────────────────────────────┐  │
│ (THE    BOND SELECTION AND RATING CRITERIA                              │  │
│HARTFORD) SBSRC                                                          │  │
│          BACK TO MENU: [▼]  [GO BACK!]                                  │  │
│ BACK TO  PRODUCER INFORMATION:                                          │  │
│ MAIN MENU AGENCY:     SIMMS AGENCY      RO - AGENCY CODE: 00-000001     │  │
│ HELP     SUB PRODUCER: [    ]           AGENT REQUESTOR: [    ]         │  │
│ EMAIL    PRINCIPAL INFORMATION                                          │  │
│          TYPE OF LEGAL ENTITY:     PRINCIPAL NAME (FIRST): (MI): (LAST):│  │
│          [CORPORATION       ▼]                                          │  │
│                              BUSINESS NAME:                             │  │
│                              [                    ]                     │  │
│                              ACTUAL NAME TO DISPLAY ON BOND:            │  │
│                              [THE ABC COMPANY, INCORPORATION]           │  │
│          BOND INFORMATION                                       512     │  │
│          SURETY:                                                        │  │
│          [HARTFORD FIRE INSURANCE COMPANY ▼] *                          │  │
│          CLASS CODE - DESCRIPTION:*                                     │  │
│          [906 ALL CONTRACTORS LICENSE - COMPLIANCE ▼]                   │  │
│          [CLASS HELP] [ORDER BY CLASS CODE DESCRIPTION]                 │  │
│          INCEPTION/EFFECTIVE DATE                                       │  │
│          [08/11/2000] *                                                 │  │
│          RISK STATE:    RISK ZIP CODE:                                  │  │
│          [CT ▼] *       [06115] *  [ZIP CODE LOOKUP]                    │  │
│          BOND FORM SELECTION CRITERIA                                   │  │
│          THIS INFORMATION WILL BE USED ONLY TO SELECT BOND FORMS.       │  │
│          OBLIGEE INFORMATION WILL BE COLLECTED LATER.                   │  │
│          STATE:              OBLIGEE NAME:                              │  │
│          [  ▼]                                                          │  │
│          IF OBLIGEE IS A GOVERNMENT ENTITY PLEASE COMPLETE INFORMATION  │  │
│          BELOW:                                                         │  │
│          POLITICAL SUBDIVISION:                                         │  │
│          [  ▼]                                                          │  │
│  ┌──────────────────────────────────────────────────────────────────────┐  │
│  ▣ ◧  DOCUMENT: DONE                                                    │  │
│ ▣START ▣ISSUE A SURETY BOND - ▣1 STEP SURETY MAIN MENU-    ...  9:27 AM │  │
└─────────────────────────────────────────────────────────────────────────────┘
```

*FIG. 4b*

```
╔═══════════════════════════════════════════════════════════════╗
║ ☒ BOND SELECTION AND RATING CRITERIA - NETSCAPE      _ □ ☒   ║
║ FILE EDIT VIEW GO COMMUNICATOR HELP                           ║
║ ┌─────────┐                                                   ║
║ │MAIN MENU│  PRINCIPAL INFORMATION                            ║
║ ├─────────┤  TYPE OF LEGAL ENTITY:  PRINCIPAL NAME (FIRST): (MI): (LAST): ║
║ │  HELP   │  CORPORATION  [▼]       [        ]  [ ]  [       ]║
║ ├─────────┤                                                   ║
║ │  EMAIL  │           BUSINESS NAME: [              ]         ║
║ └─────────┘           ACTUAL NAME TO DISPLAY ON BOND:         ║
║              THE ABC COMPANY, INCORPORATION                   ║
║                                                               ║
║   BOND INFORMATION                                            ║
║   SURETY:                                                     ║
║   HARTFORD FIRE INSURANCE COMPANY [▼] *                       ║
║   CLASS CODE - DESCRIPTION:*                                  ║
║   906 ALL CONTRACTORS LICENSE - COMPLIANCE [▼]                ║
║   CLASS HELP    ORDER BY CLASS CODE DESCRIPTION               ║
║   INCEPTION/EFFECTIVE DATE                                    ║
║   08/11/2000 *                                                ║
║   RISK STATE:    RISK ZIP CODE:                               ║
║   CT [▼]         06115  *    ZIP CODE LOOKUP                  ║
║   BOND FORM SELECTION CRITERIA                                ║
║   THIS INFORMATION WILL BE USED ONLY TO SELECT BOND FORMS. OBLIGEE INFORMATION WILL BE COLLECTED LATER. ║
║   STATE:              OBLIGEE NAME:                           ║
║   [▼]                 [            ]                          ║
║   IF OBLIGEE IS A GOVERNMENT ENTITY PLEASE COMPLETE INFORMATION BELOW: ║
║   POLITICAL SUBDIVISION:                                      ║
║   [---▼]                                                      ║
║   SELECT CUSTOMER INFORMATION - HARTFORD INTERNAL USE ONLY    ║
║   AIF#            MSI:                                        ║
║   [       ]       [    ]                                      ║
║                                                               ║
║   CONTINUE  NOTES  BACK TO MAIN MENU                          ║
║                                                         512   ║
║ DOCUMENT: DONE                                                ║
╚═══════════════════════════════════════════════════════════════╝
```

FIG. 5

```
IDENTITY BOND FORMS - NETSCAPE
FILE EDIT VIEW GO COMMUNICATOR HELP
```

THE HARTFORD

IDENTITY BOND FORM
SIBF

BACK TO MENU: [_____▼] [GO BACK!]

BACK TO MAIN MENU
HELP
EMAIL

SELECT BOND FORM (SEARCH RESULTS)

PRINT PREVIEW
HELP DESCRIPTION

STREET OPENING
LICENSE AND PERMIT BOND
LICENSE BOND
GENERIC LICENSE AND PERMIT BOND – INDEFINITE TERM
GENERAL BOND FORM–LICENSE & PERMIT
EXCAVATION BOND
TOWN OF BLOOMFIELD–BOND TO WORK WITHIN THE PUBLIC RIGHT O...
GENERIC INDEFINITE – LICENSE & PERMIT
TOWN OF WITHERSFIEL – CURB & WALK LAYER'S BOND
TOWN OF SOUTH WINDSOR DRAIN LAYER'S OR EXCAVATION BOND   } 522

⊙ USE FORM SELECTED ABOVE
○ FORM NOT FOUND, CONTINUE WITHOUT
○ FORM NOT REQUIRED/APPLICABLE

[CONTINUE] [TRY SEARCH AGAIN] [BACK TO MAIN MENU]

520
515

DOCUMENT: DONE

START | IDENTITY BONDS FORMS–.. | 1 STEP SURETY MAIN MENU–...

```
SURETY UNDERWRITING INFORMATION - NETSCAPE
FILE EDIT VIEW GO COMMUNICATOR HELP

THE
HARTFORD         SURETY UNDERWRITING INFORMATION
                 SUI

BACK TO          BACK TO MENU: [        ▼]  [GO BACK!]
MAIN MENU
                 SURETY UNDERWRITING INFORMATION
HELP
                 LICENSE & PERMIT BONDS
EMAIL
                 HOW LONG HAS THE APPLICANT BEEN IN BUSINESS [     ]
                 UNDER THE CURRENT NAME OWNERSHIP?

FOR BONDS GUARANTEEING PAYMENT OF TAXES OR OTHER MONIES, COMPLETE THE FOLLOWING:

INDEMNITORS & RELATIONSHIP TO             [     ]
                 APPLICANT (INCLUDING APPLICANT):

RESULTS OF FINANCIAL ANALYSIS:  ○ BUSINESS  ○ PERSONAL

NET WORTH:
                 WORKING CAPITAL:
                 TOTAL REVENUE:
                 TOTAL DEBT:
                                                              540
                 [CONTINUE] [NOTES] [BACK TO MAIN MENU]

DOCUMENT: DONE
```

FIG. 8

UNDERWRITING CHECK
GNUC

BACK TO MENU: [_____▼]  [GO BACK!]

THIS BOND IS ELIGIBLE FOR SYSTEM UNDERWRITING

PLEASE ASSURE THE ACCURACY OF YOUR ANSWERS TO THE FOLLOWING QUESTIONS; THEY ARE THE BASIS FOR YOUR AUTOMATED UNDERWRITING AUTHORITY.

1. HAS THE APPLICANT BEEN IN BUSINESS AT LEAST 3 YEARS IN SAME LOCATION?  ○YES ●NO
2. DOES THE BOND GUARANTEE PAYMENT OF TAXES AND/OR FEES?  ○YES ●NO
   (IF YES--OBTAIN FINANCIAL STATEMENT)
3. HAS THE APPLICANT EVER FILED FOR BANKRUPTCY?  ○YES ●NO
4. HAS THE APPLICANT HAVE(OR PENDING) ANY SUITS OR JUDGEMENTS?  ○YES ●NO
5. DOES THE BOND GUARANTEE ANY TYPE OF ENVIRONMENTAL/POLLUTION EXPOSURE?  ○YES ●NO

[CONTINUE] [NOTES] [BACK TO MAIN MENU]

```
FORM SPECIFIC- NETSCAPE
FILE EDIT VIEW GO COMMUNICATOR HELP

FORM-SPECIFIC INFORMATION
            GNFSI
THE
HARTFORD    BACK TO MENU: [_____|▼] [GO BACK!]

BACK TO     BOND NUMBER: 00BSBAB7737
MAIN MENU
            SIGNED AND SEALED DATE
HELP
            SIGNED AND SEALED DATE: [8/11/2000]
EMAIL
            GENERAL BOND FORM-LICENSE & PERMIT

ENTER TYPE OF UNDERTAKINGS REQUIRED: [FORM SPECIFIC FIELD]

ENTER OBLIGATION DESCRIPTION: [FORM SPECIFIC FIELD]

INVOICE
            NO ADDITIONAL FIELDS ARE REQUIRED FOR THIS FORM.

POWER OF ATTORNEY - HARTFORD FIRE INSURANCE COMPANY
            [PRINTED PREVIEW] [BOOK W/O PRINT] [BOOK AND PRINT]
                             [BACK TO MAIN MENU]

NO ADDITIONAL FIELDS ARE REQUIRED FOR THIS FORM.
                                                                    600

DOCUMENT: DONE
START  FORM-SPECIFIC INFORMA...  1 STEP SURETY MAIN MENU-...     9:27 AM
```

FIG. 14

ACTIVITY FOR BOND NUMBER: 00BSBAB7737 HAS BEEN RECORDED AT THE HARTFORD.

| FORM NUMBER | FORM NAME | PAPER TYPE |
|---|---|---|
| ○ ALL_LETTER | ALL FORMS TO BE PRINTED ON LETTER SIZE PAPER | LETTER SIMPLEX |
| ○ POA17 | POWER OF ATTORNEY-HARTFORD FIRE INSURANCE COMPANY | LETTER SIMPLEX |
| ○ ./GEN872 | GENERAL BOND FORM-LICENSE & PERMIT | LETTER SIMPLEX |
| ○ 625V2 | INVOICE | LETTER SIMPLEX |

610

VEIW FORM    BACK TO MAIN MENU

NOTIFICATION
GNFP

BACK TO MAIN MENU
HELP
EMAIL

HARTFORD, CONNECTICUT
POWER OF ATTORNEY

KNOW ALL MEN BY THE PRESENTS , THE HARTFORD FIRE COMPANY,
A CORPORATION DULY ORGANIZED UNDER THE LAWS OF THE STATE OF
CONNECTICUT, AND HAVING ITS PRINCIPAL OFFICE IN THE CITY OF HARTFORD,
STATE OF CONNECTICUT, DOES HEREBY MAKE, CONSTITUTE AND APPOINT.
DOUGLAS E. BARNETTE, CLAUDETTE BLONDIN, BEVERLY BOHNERT, JOE BONDCENTER
JOEL CANNON, SHAYN'E DALY, SUSAN FULMER, SUSAN GAGNE, SHARON GRIFFITH,
DEBBIE HART, CELESTE HOLMES, DANILLE HUSSEY, FIRST LAST, DON LONGSHORE,
VAL MCCORMICK, D. RICHENDOLLAR, KATHY RADTKE, TERRI REINERTSEN, TERI
REINERTSEN, DOLORES RICHENNDOLLAR, ANIKA RIVERA, MARK H. SEMEL, HELENA
SIVAK, BRITANY SLABAUGH, T TRAJICK, TONYA E. TASCHEREAU, JOANN TIMPERLEY,
TERRI TRAJICK, V WHEELER, E WILLNER, VICKI WHEELER, VICKI WHEELER, LAURA
WILLIAMS, EVELYN WILLNER OF HARTFORD, CONNECTICUT.
ITS TRUE AND LAWFUL ATTORNEY(S)-IN-FACT, WITH FULL POWER AND AUTHORITY TO
EACH OF SAID ATTORNEY(S)-IN-FACT, IN THEIR SEPARATE CAPACITY IF MORE THAN
ONE IS NAMED ABOVE, TO SIGN, EXECUTE AND
ACKNOWLEDGE ANY AND ALL BONDS AND UNDERTAKINGS AND OTHER WRITINGS
OBLIGOATORY IN THE NATURE THEREOF ON BEHALF OF THE COMPANY IN ITS
BUSINESS OF GUARANTEEING THE FIDELITY OF PERSONS HOLDING PLACES OF PUBLIC
OR PRIVATE TRUST; GUARANTEEING THE PERFORMANCE OF CONTRACTS OTHER THAN
INSURANCE POLICIES; GUARANTEEING THE PERFORMANCE OF INSURANCE CONTRACTS
WHERE SURETY BONDS ARE ACCEPTED BY STATES AND MUNICIPALITIES; AND
EXECUTING OR GUARANTEEING BONDS AND UNDERTAKINGS REQUIRED OR PERMITTED
IN ALL ACTIONS OR PROCEEDINGS OR BY LAW ALLOWED, IN PENALTIES NOT EXCEEDING
THE SUM OF..............................................................................................................
UNLIMITED.
AND TO BIND HARTFORD FIRE INSURANCE COMPANY THEREBY AS FULLY AND TO THE
SAME EXTENT AS IF SUCH BONDS AND UNDERTAKINGS AND OTHER WRITINGS
OBLIGATORY IN THE NATURE THEREOF WERE SIGNED BY AN EXECUTIVE OFFICER OF
HARTFORD FIRE INSURANCE COMPANY AND SEALED AND ATTESTED BY ONE OTHER OF
SUCH OFFICERS. AND HEREBY RATIFIES AND CONFIRMS ALL THAT ITS SAID ATTORNEY(S)
-IN-FACT MAY DO IN PURSUANCE HEREOF.
THIS POWER OF ATTORNEY IS GRANTED UNDER AND BY AUTHORITY OF THE BY-LAWS OF
HARTFORD FIRE INSURANCE COMPANY, ("THE COMPANY") AS AMENDED BY THE BOARD
OF DIRECTORS AT A MEETING DULY CALLED AND HELD ON JULY 9, 1997, AS FOLLWS:
ARTICLE IV
SECTIONS 7. THE PRESIDENT OR ANY VICE PRESIDENT, ACTING WITH ANY SECRETARY OR
ASSISTANT SECRETARY SHALL HAVE THE POWER AND AUTHORITY TO SIGN AND EXECUTE
AND ATTACH THE SEAL OF THE COMPANY TO BONDS AND UNDERTAKINGS, RECOGNIZANCES,
CONTRACTS OR INDEMNITY AND OTHER WRITINGS IN THE NATURE THEREOF, AND SUCH
INSTRUMENTS SO SIGNED AND EXECUTED, WITH OR WITHOUT THE COMMON SEAL, SHALL BE
VALID AND BINDING UPON THE COMPANY.
SECTION 8. THE PRESIDENT OR ANY ASSISTANT VICE PRESIDENT ACTING WITH ANY
SECRETARY OR ASSISTANT SECRETARY, SHALL HAVE POWER AND AUTHORITY TO APPOINT,
FOR PURPOSES ONLY OF EXECUTING AND ATTESTING BONDS AND UNDERTAKINGS AND OTHER
WRITINGS OBLIGATORY IN THE NATURE THEREOF, ONE OR MORE RESIDENT VICE PRESIDENTS,
RESIDENT ASSISTANT SECRETARIES AND ATTORNEYS-IN-FACT AND AT ANY TIME TO REMOVE
ANY SUCH RESIDENT VICE-PRESIDENT, RESIDENT ASSISTANT SECRETARY, OR ATTORNEY-IN-
FACT, AND REVOKE THE POWER AND AUTHORITY GIVEN TO HIM.

*FIG. 15A*

RESOLVED, THAT THE SIGNATURES OF SUCH OFFICERS AND THE SEAL OF THE COMPANY MAY BE AFFIXED TO ANY SUCH POWER OF ATTORNEY OR TO ANY CERTIFICATE REALTING THERETO BY FACSIMILE, AND ANY SUCH POWER OF ATTORNEY OR CERTIFICATE BEARING SUCH FACSIMILE SIGNATURES OF FACSIMILE SEAL SHALL BE VALID AND BINDING UPON THE COMPANY AND ANY SUCH POWER SO EXECUTED AND CERTIFIED BY FACSIMILE SIGNATURES AND FACSIMILE SEAL SHALL BE VALID AND BINDING UPON THE COMPANY IN THE FUTURE WITH RESPECT TO ANY BOND OR UNDERTAKING TO WHICH IT IS ATTACHED.

IN WITNESS WHEREOF, HARTFORD FIRE INSURANCE COMPANY HAS CAUSED THESE PRESENTS TO BE SIGNED BY ITS ASSISTANT VICE-PRESIDENT, AND ITS CORPORATE SEAL TO BE HERETO AFFIXED, DULY ATTESTED BY ITS SECRETARY, THIS 17TH DAY OF SEPTEMBER, 1997.

PAUL A. BERGENHOLTZ, ASSISTANT SECRETARY

HARTFORD FIRE INSURANCE COMPANY

ROBERT L. POST, ASSISTANT VICE PRESIDENT

STATE OF CONNECTICUT } SS.
COUNTY OF HARTFORD

ON THIS 17TH DAY OF SEPTEMBER, , A.D. 1997, BEFORE ME PERSONALLY CAME ROBERT L. POST, TO ME KNOWN, WHO BEING BY ME DULY SWORN, DID DEPOSE AND SAY: THAT HE RESIDES IN THE COUNTY OF HARTFORD, STATE OF CONNECTICUT; THAT HE IS THE ASSISTANT VICE-PRESIDENT OF HARTFORD FIRE INSURANCE COMPANY, THE CORPORATION DESCRIBED IN AND WHICH EXECUTED THE ABOVE INSTRUMENT; THAT HE KNOWS THE SEAL OF THE SAID CORPORATION; THAT THE SEAL AFFIXED TO THE SAID INSTRUMENT IS SUCH CORPORATE SEAL; THAT IT WAS SO AFFIXED BY ORDER OF THE BOARD OF DIRECTORS OF SAID CORPORATION AND THAT HE SIGNED HIS NAME THERETO BY LIKE ORDER.

STATE OF CONNECTICUT } SS.
COUNTY OF HARTFORD

JEAN H. WOZNIAK
NOTARY PUBLIC
MY COMMISSION EXPIRES JUNE 30, 2004

CERTIFICATE

I, THE UNDERSIGNED, SECRETARY OF HARTFORD FIRE INSURANCE COMPANY, A CONNECTICUT CORPORATION, DO HEREBY CERTIFY THAT THE FOREGOING AND ATTACHED POWER OF ATTORNEY REMAINS IN FULL FORCE AND HAS NOT BEEN REVOKED; AND FURHTERMORE, THAT ARTICLE IV, SECTIONS 7 AND 8 OF THE BY-LAWS OF HARTFORD FIRE INSURANCE COMPANY, SET FORTH IN THE POWER OF ATTORNEY, ARE NOW IN FORCE.

SIGNED AND SEALED AT THE CITY OF HARTFORD.  DATED THE 11TH DAY OF AUGUST 2000

RICHARD L. MARSHALL, JR., ASSISTANT SECRETARY

J. DENNIS LANE, ASSISTANT VICE PRESIDENT

FORM S-3507-9 (HF) PRINTED IN U.S.A.

*FIG. 15B*

GENERAL BOND FORM  BOND NO. 00BSBAB7737

THE HARTFORD

HARTFORD PLAZA
HARTFORD, CONNECTICUT 06115

KNOW ALL MEN BY THESE PRESENTS, THAT WE, THE ABC COMPANY, INFORPORATION (HEREINAFTER CALLED PRINCIPAL), AS PRINCIPAL, AND HARTFORD FIRE INSURANCE COMPANY A CORPORATION ORGANIZED AND DOING BUSINESS UNDER AND BY VIRTUE OF THE LAWS OF THE STATE OF CONNECTICUT, AND DULY LICENSED FOR THE PURPOSE OF MAKING, GUARANTEEING OR BECOMING SOLE SURETY UPON BONDS OR FORM SPECIFIC FIELD UNDERTAKINGS REQUIRED OR AUTHORIZED BY THE LAWS OR THE STATE OF CONNECTICUT (HEREINAFTER CALLED SURETY)

AS SURETY, ARE HELD AND FIRMLY BOUND UNTO STATE OF CT (HEREINAFTER CALLED OBLIGEE)

IN THE JUST AND FULL SUM OF ONE HUNDRED TWENTY-FIVE THOUSAND

DOLLARS ($125,000) LAWFUL MONEY OF THE UNITED STATES OF AMERICA, FOR THE PAYMENT OF WHICH, WELL AND TRULY BE MADE, WE HEREBY BIND OURSELVES AND OUR AND EACH OF OUR SUCCESSORS AND ASSIGNS, JOINTLY AND SERVERALLY, FIRMLY BY THESE PRESENTS.

THE CONDITION OF THIS OBLIGATION ARE SUCH THAT, WHEREAS,
FORM SPECIFIC FIELD

IN WITNESS WHEREOF, SAID PRINCIPAL AND SAID SURETY HAVE CAUSED THESE PRESENTS TO BE DULY SIGNED AND SEALED THIS 11TH DAY OF AUGUST, A.D. 2000

THE ABC COMPANY, INCORPORATION .........{SEAL}
...........................................................{SEAL}
HARTFORD FIRE INSURANCE COMPANY
BY .....................................................
CLAUDETTE BLONDIN, ATTORNEY-IN-FACT

FORM S-3705-1  PRINTED IN U.S.A.

*FIG. 16*

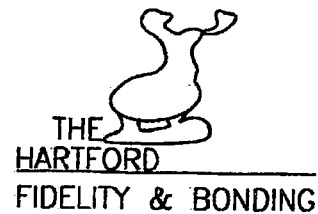

THE
HARTFORD
FIDELITY & BONDING

DATE: AUG 11, 2000          AGENCY CODE: 00-000001

SIMMS AGENCY
199 MAIN STREET

HARTFORD CT 06115
ATTN: BOND DEPARTMENT

INSURED/PRINCIPAL:              THE ABC COMPANY, INCORPORATION
POLICY/BOND#:                   00BSBAB7737
ACCOUNT NAME/NUMBER:
POLICY TERM:                    AUG 11, 2000 – AUG 11, 2001
TYPE OF POLICY:                 SURETY – LICENSE & PERMIT
BILLING TERM:                   ANNUAL
BILLING TYPE:                   ANGENCY BOND
TRANSACTION TYPE:               NEW BOND
TRANSACTION EFFECTIVE DATE:     AUG 11, 2000
BOND LIMIT:                     $125,000

AGENT'S ADVICE OF PREMIUM FOR FIDELITY AND SURETY BONDS

| PREMIUM | COMMISSION% | COMMISSION AMOUNT |
|---------|-------------|-------------------|
| $625    | 20.00 %     | $125              |

PREMIUM WILL BE INCLUDED IN YOUR USUAL AGENCY ACCOUNTING STATEMENT OR DIRECT BILL NOTIFICATION. IF YOU HAVE ANY QUESTIONS REGARDING THIS TRANSACTION, PLEASE CONTACT YOUR HARTFORD BOND CENTER.

ISSUE A FIDELITY POLICY - NETSCAPE
FILE EDIT VIEW GO COMMUNICATOR HELP

ISSUE A FIDELITY POLICY
GNSLOB

THE HARTFORD

BACK TO MAIN MENU
HELP
EMAIL

TYPE OF COVERAGE

- ⊙ COMMERCIAL CRIME
- ○ PUBLIC EMPLOYEE
- ○ FINACIAL INSTITUTIONS – BANKS
- ○ FINACIAL INSTITUTIONS – STOCKBROKERS
- ○ FINACIAL INSTITUTIONS – MORTGAGE AND FINANCE COMPANIES
- ○ FINACIAL INSTITUTIONS – INSURANCE COMPANIES
- ○ FINACIAL INSTITUTIONS – CREDIT UNIONS
- ○ FINACIAL INSTITUTIONS – COMBINATION SAFE DEPOSITORY POLICY
- ○ FINACIAL INSTITUTIONS – COMPUTER CRIME POLICY

FOR COMPUTER CRIME POLICIES ONLY

TYPE OF ENTITY: [____]

[CONTINUE]  [BACK TO MAIN MENU]

DOCUMENT: DONE

UNDERWRITING CHECK – NETSCAPE

FILE EDIT VIEW GO COMMUNICATOR HELP

UNDERWRITING CHECK
GNUC

BACK TO MENU: [         ] [GO BACK!]

THIS BOND IS ELIGIBLE FOR SYSTEM UNDERWRITING

BACK TO MAIN MENU

HELP

EMAIL

PLEASE ASSURE THE ACCURACY OF YOUR ANSWERS TO THE FOLLOWING QUESTIONS; THEY ARE THE BASIS FOR YOUR AUTOMATED UNDERWRITING AUTHORITY

1. ARE AT LEAST TWO SIGNATURES REQUIRED ON CHECKS? ⊙ YES ○ NO
2. DO EMPLOYEES WHO RECONCILE MONTHLY BANK STATEMENTS ALSO SIGN CHECKS? ⊙ YES ○ NO
3. IS AN INDEPENDENT CERTIFIED PUBLIC ACCOUNTANT INVOLVED IN THE APPLICANTS FINANCIAL REPORTING? ⊙ YES ○ NO
4. HAS ANY SIMILIAR INSURANCE BEEN DECLINED OR CANCELED DURING THE PAST THREE YEARS? ○ YES ⊙ NO
5. HAVE THERE BEEN ANY LOSSES DISCOVERED OR SUSTAINED IN THE LAST SIX YEARS THE SUM OF WHICH EXCEED THE PROPOSED DEDUCTIBLE? ○ YES ⊙ NO
6. DO EMPLOYEES WHO RECONCILE MONTHLY BANK STATEMENTS HANDLE BANK DEPOSITS? ○ YES ⊙ NO
7. DO EMPLOYEES WHO RECONCILE MONTHLY BANK STATEMENTS HAVE ACCESS TO CHECK SIGNING MACHINES OR SIGNATURE PLATES? ○ YES ⊙ NO

[CONTINUE] [NOTES] [BACK TO MAIN MENU]

DOCUMENT: DONE

FIG. 19

METHOD AND SYSTEM FOR ISSUING INSURANCE UNDERWRITING INSTRUMENTS

RELATED APPLICATION

This application is a continuation of co-pending U.S. patent application Ser. No. 09/738,023, entitled METHOD FOR ISSUING INSURANCE UNDERWRITING INSTRUMENTS, filed Dec. 15, 2000, which application claims priority under 35 U.S.C. §119(e) of commonly assigned, U.S. provisional patent application Ser. No. 60/171,177, filed on Dec. 16, 1999, entitled "METHOD AND APPARATUS FOR ISSUING INSURANCE POLICIES ONE STEP SURETY", the entire disclosures of which are hereby incorporated by reference herein in their entireties.

FIELD OF INVENTION

The present invention relates to a method and system for completing insurance application forms, and more particularly to an automated system offering the capability to quote, issue, and modify surety bonds and fidelity policies via a global telecommunication network such as the Internet.

BACKGROUND OF INVENTION

Underwriting insurance policies can be a complex and time consuming process. Many variables are considered in recognizing and qualifying the risks associated with underwriting a particular insurance policy, such as the location of the insured party and the reason for that policy. In particular, with respect to fidelity policies and surety bonds, the location of the particular job to be insured as well as the total contract amount of the project are typically important factors in setting premium rates. Different localities, such as different states often have different premium rates. Also, different areas within a state can carry different levels of risks associated with construction projects, for example.

Because of the many types of businesses and contracts that fidelity policies and surety bonds can be used to provide against loss for, the myriad variety of different forms required for underwriting such policies and the types of information needed to complete these forms makes the underwriting process a time intensive and complex one.

In the case of a fidelity policy for example, the type of business that is to be insured (whether it be a small business or a large corporation), the number of employees, as well as the location of that business, among other factors, are taken into consideration when quoting and providing a fidelity policy which will cover burglary and fire insurance for that business. Additional factors that can affect the premium amount for such a policy, such as past claims, are also taken into consideration when a fidelity policy underwriter is determining whether or not to issue such a policy to a prospective client. In the case of a surety bond for example, such as when guaranteeing the performance of a construction contract, the type of building to be constructed, the area where it is to be constructed and the number of people working on that contract within a given time period are all relevant factors to be investigated by the bond underwriters. Again, different types of contracts require different types of surety bond form applications which must be selected correctly in order to adequately underwrite the bond and determine what the costs or premium of that bond will be. As the former tends to continually change over time, an insurance agent typically must periodically update his inventory of blank forms, discarding those that have been changed or superseded.

For these reasons, many insurance underwriters have opted not to underwrite fidelity policies or surety bonds, because of the complexities involved. For example, these types of policies require complex risk rating methodologies, non-standard contract terms and conditions, and using specialized legal documents such as Powers of Attorney, which must accompany the underwriting contract. Accordingly, there is a need for a system and method whereby fidelity policies and surety bonds can be quickly and accurately completed, and wherein risks are adequately and completely analyzed and considered in setting the insurance premium price.

SUMMARY OF INVENTION

A method for issuing an insurance underwriting instrument using at least one computing processor, the method including: identifying data stored in a plurality of memory locations and being indicative of a select one of a plurality of customers; receiving data indicative of an insurance instrument to be associated with the select customer; automatically calculating at least one rate associated with the insurance instrument using the data indicative of the customer and data indicative of the insurance instrument; selecting at least one of a plurality of forms for the insurance instrument using the data indicative of the insurance instrument; and, automatically rendering the at least one form using the at least one rate, the data indicative of the customer, and data indicative of the insurance instrument; wherein, the calculating and rendering are performed using the at least one computing processor.

BRIEF DESCRIPTION OF THE DRAWINGS

Various other features and advantages of the invention will become more apparent by reading the following detailed description in conjunction with the drawings, which are shown by way of example only, wherein:

FIG. 3 illustrates a display showing examples of various types of surety bonds a user may select according to one aspect of the present invention;

FIGS. 4A and 4B illustrate displays for entering bond selection and rating criteria after the type of surety bond has been selected from FIG. 3 according to an aspect of the present invention;

FIG. 5 illustrates a display for identifying a bond form to use for the issued insurance underwriting instrument according to an aspect of the present invention;

Figure 6:
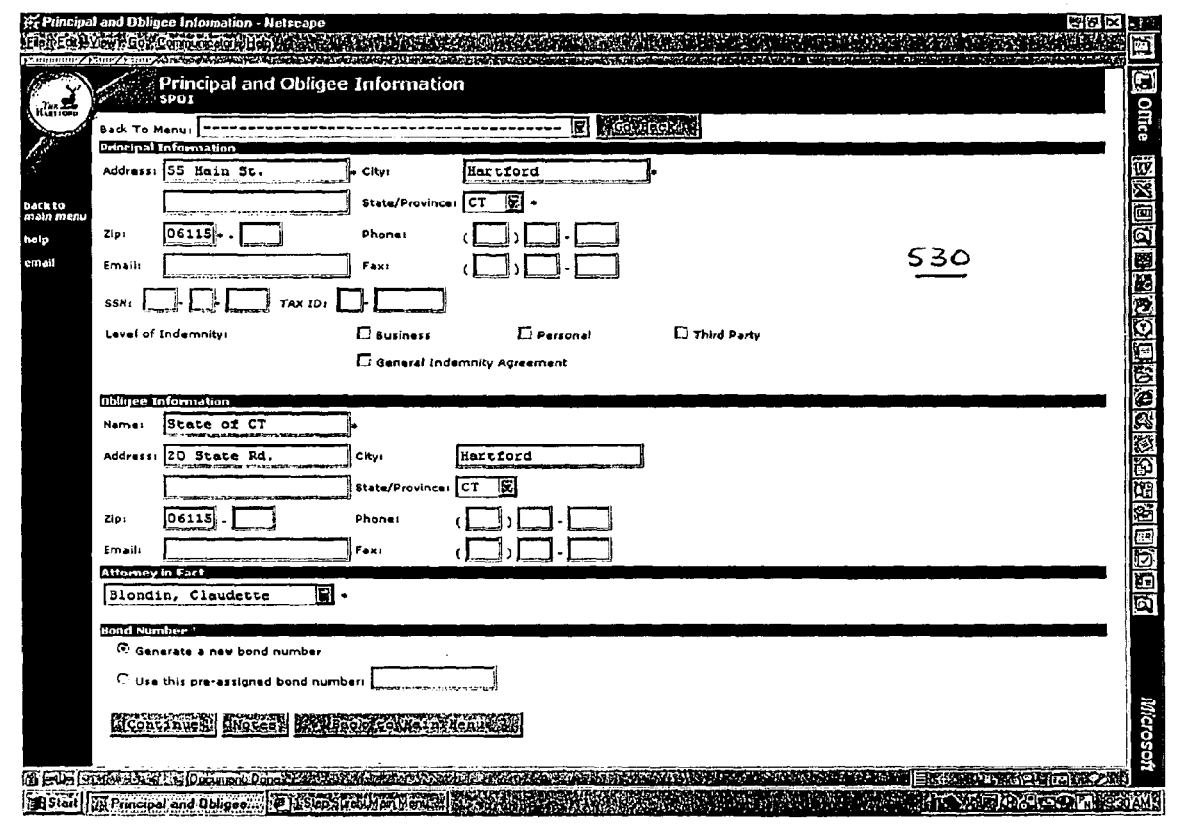

FIG. 6 illustrates a display for entering principal and obligee information for the selected bond according to an aspect of the present invention;

FIG. 7 illustrates a display for entering surety underwriting information for the selected bond according to an aspect of the present invention;

FIG. 8 illustrates a display for performing an underwriting check according to an aspect of the present invention;

Figure 10:
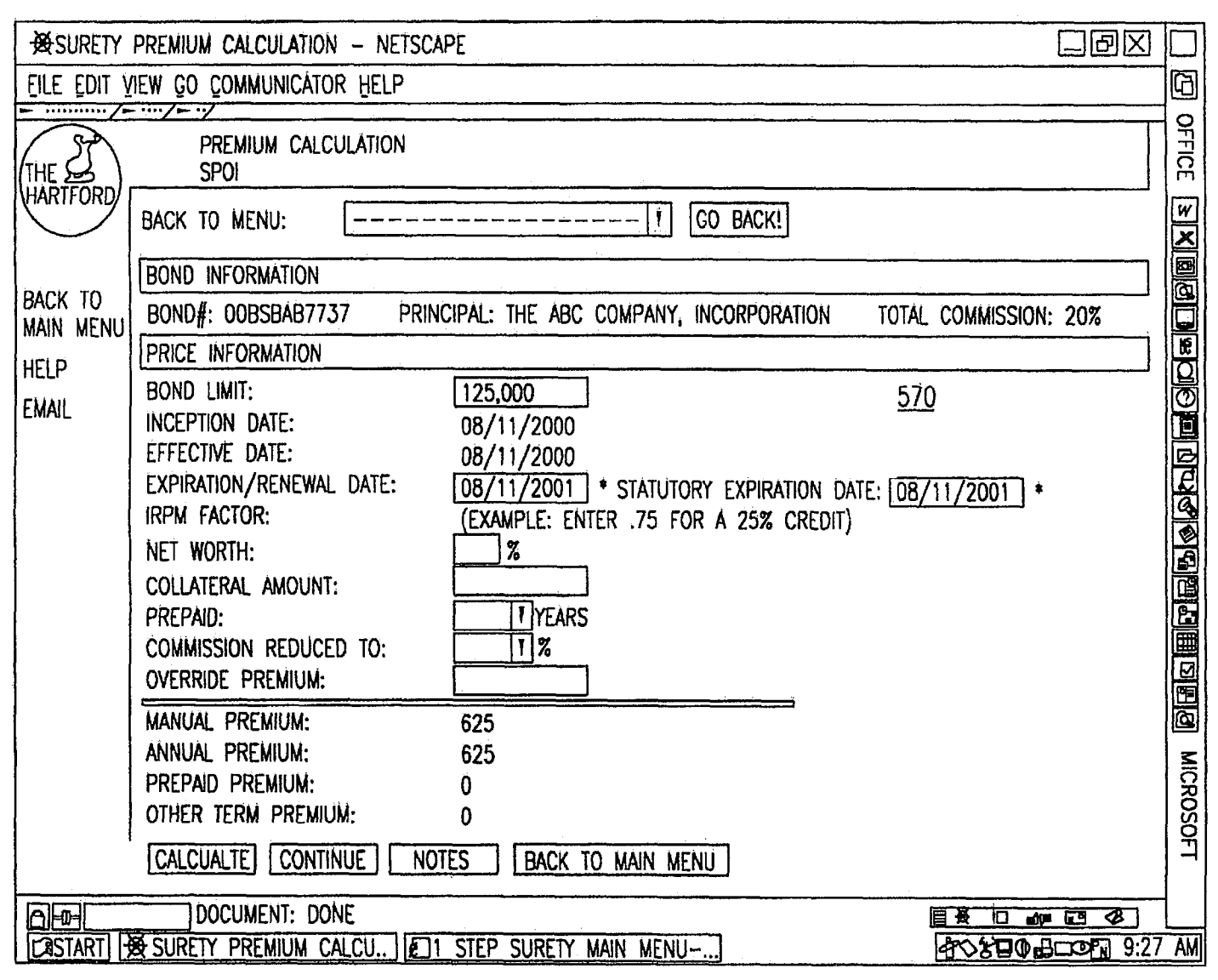

FIG. 10 illustrates a display for inputting premium calculations for the selected bond according to an aspect of the present invention;

FIG. 13 illustrates a display for inputting additional information to be included on the selected bond according to an aspect of the present invention;

FIG. 14 illustrates a display for communicating a bond summary and for selecting ones of the selected forms to view according to an aspect of the present invention;

FIG. 15 illustrates an exemplary power of attorney issued by a system according to an aspect of the present invention;

FIG. 16 illustrates an exemplary general bond form issued by a system according to an aspect of the present invention;

FIG. 17 illustrates an exemplary invoice issued by a system according to an aspect of the present invention;

Figure 18B:
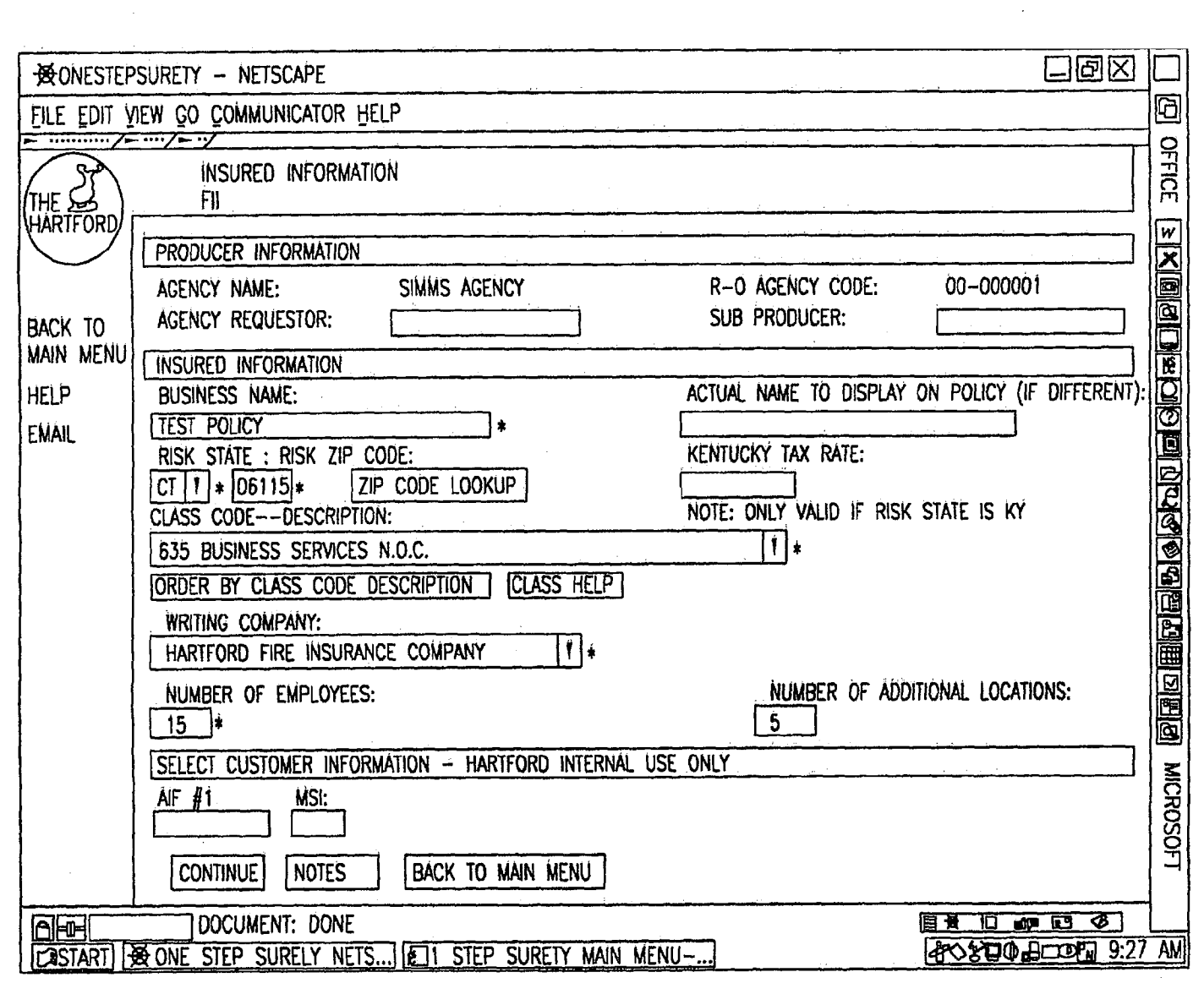

FIG. 18A illustrates a display showing examples of various types of fidelity policies a user may select according to an aspect of the present invention;

FIG. 18B illustrates a display for entering insured information according to an aspect of the present invention;

FIG. 18C illustrates a display for performing an underwriting check for a fidelity policy according to an aspect of the present invention;

FIG. 19 illustrates a display for inputting quote information of a fidelity policy according to an aspect of the present invention;

Figure 1:
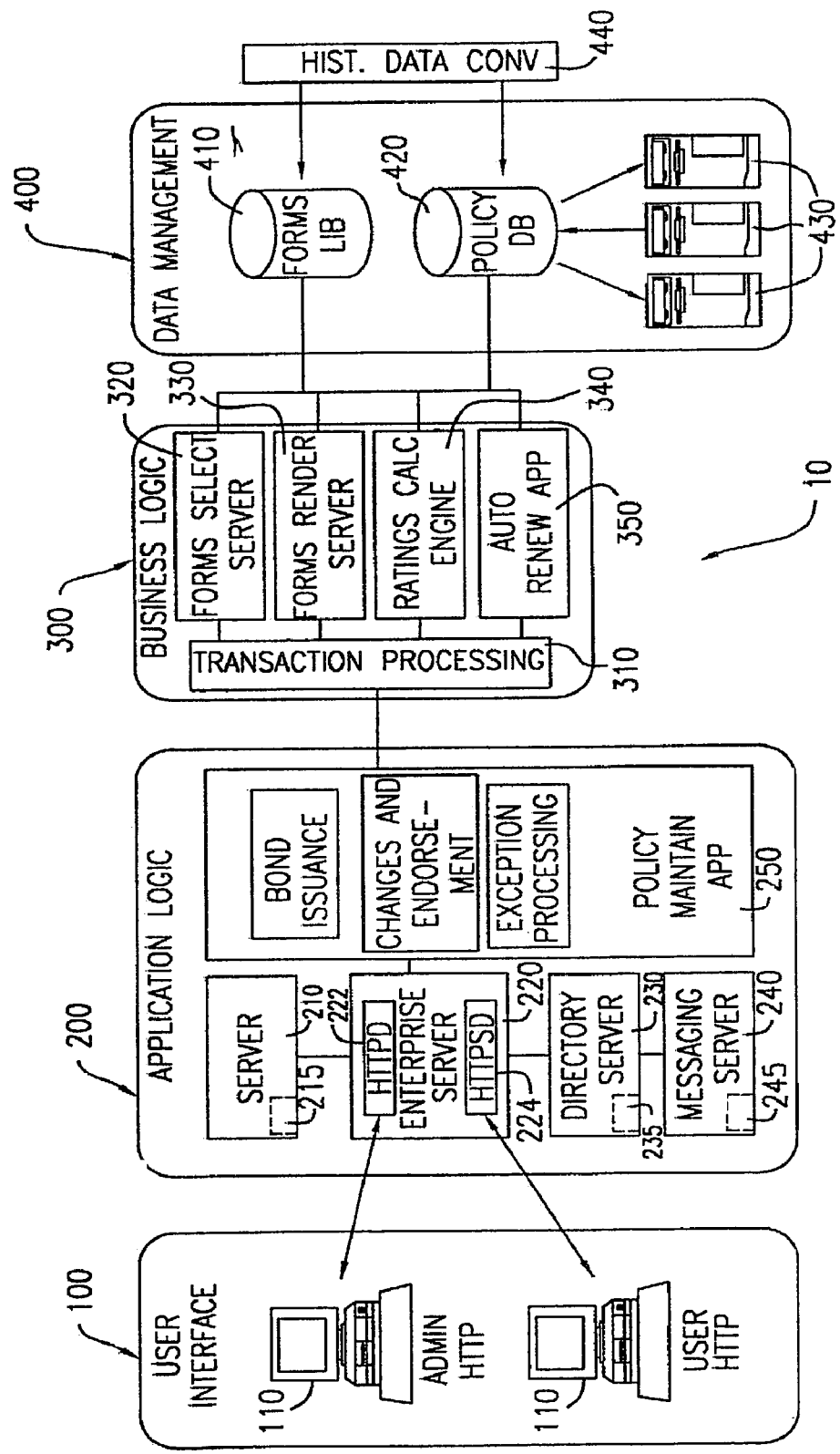
FIG. 1 is a functional diagram of a technical architecture of various components according to one aspect of the present invention.

DETAILED DESCRIPTION OF A PREFERRED
FORM OF THE PRESENT INVENTION

Referring now to the drawings in detail, there will be described herein a preferred embodiment for a system to automatically quote, issue and modify insurance instruments such as surety bonds and fidelity policies via a global telecommunication network such as the Internet. While specific embodiments will be discussed herein, it will be readily appreciated by those skilled in the art that various modifications and alternatives to the embodiments described herein will fall within the scope of the invention. For sake of clarity, like references within various ones of the Figures identify like elements of the invention.

As shown in FIG. 1, the technical architecture of a system 10 according to a preferred form the present invention preferably includes four (4) primary layers: user interface layer 100; application logic layer 200; business logic layer 300; and database management layer 400. Each layer 100, 200, 300, 400 is designed to perform various functions of the policy preparation process in a manner which facilitates the preparation of insurance underwriting instruments such as surety bond and fidelity policy documents by agents, i.e. users, as well as providing a potential customer with a quick and easy summary of the insurance needs and premiums that it will need to evaluate in order to accept such a policy.

The user interface layer 100 includes a common web browser such as Microsoft Internet Explorer™ or Netscape Navigator™ being communicable with the application logic layer 200 via a computer network such as the global interconnection of computers and computer networks commonly referred to as the Internet, using a document viewer such as Adobe Acrobat™, and the web browsers' e-mail client. The application logic layer 200 comprises functionality associated with serving web pages and presentation logic. The business logic layer 300 comprises components that execute computational or database intensive logic, such as for selecting forms, rendering forms and conducting rating and premium calculations. The database management layer 400 comprises three components: a forms library 410, a policy database 420, and external interfaces 430 to other insurance underwriting programs such as CAPIS, a new premiums processing system (NPPS) and TABS. CAPIS, as used herein refers to a program used to maintain agent records, NPPS as used herein refers to a program used to maintain premiums records, and TABS as used herein is a billing system. Using the system 10 comprising the functional layers 100, 200, 300 and 400, an insurance agent, i.e. user, utilizes screen displays generated to input information needed to prepare a surety bond or a fidelity bond policy for a customer.

In order to more fully define the operation of the system 10 according to a preferred form of the present invention, each of the functional layers 100, 200, 300 and 400 described above will be more fully explained.

In the user interface layer 100, a common web browser such as Netscape Navigator™ or Microsoft Internet Explorer™ running on a suitable microprocessor based device 110 such as a personal computer utilizing a suitable operating system such as Microsoft Windows™ for example, can be used to provide users, or agents, with access to the system 10 according to the present invention. Interactions between an agent and the system 10 can be done through a keyboard, mouse and suitable display device coupled to the device 110 for example. The user interface layer 100 thus controls the system 10 interface with the agents, e.g. applications screens, views and prints bond forms, and sends and receives e-mail messages from the underwriter to the agent for example. Thus, the user interface layer 100 presents the user with system screen images relevant to the user's task at hand. In order to control user access and functionality the system 10 requests from each user or the agent requesting access, a valid user identification password, which must be entered to access his or her information. Preferably, interactions between the agent and the system 10 via the interface layer 100 of the present invention are secured using suitable encryption methodology as is well known in the art, such as Secure Socket Layer (SSL) technology, for example.

In addition to supporting a policy maintenance function, the user interface layer 100 preferably also provides a number of functions for bond forms. Specifically, the user interface layers 100 enables viewing and printing of forms generated from the forms library 410. Preferably the web browser running on the device 110 works in conjunction with a commercially available document viewing program also running on the device 110, such as Adobe Acrobat Reader™, to enable a user to zoom into particular areas of the form, scroll up and down between pages of the form, and to view directly any portion of completed bond form, for example.

Preferably, the user interface layer 100 also provides for electronic mail (e-mail) capabilities between an agent and an underwriter for example. By configuring the agent's web browser running on a device 110 to access e-mail server 240 via any suitable communications medium, such as a direct telephone link, or via the Internet for example, an agent may send and receive e-mail via the system 10. Through this capability, an agent may send an e-mail message to the underwriter staff member or to another agent with an e-mail account on the system 10, to enable the timely exchange of information. Additionally, a staff member of the underwriter can send an e-mail directly to an agent so as to answer questions the agent may have about the particular policy, for example. The user interface layer 100 communicates with and passes user requests to the application logic layer 200.

The application logic layer 200 defines and controls the flow of a users' interaction with the system 10. This layer 200 handles user requests received from the user interface layer 100. In order to respond to those requests that require complex database access or resource intensive processing, such as forms rendering and premium calculations for example, the application logic layer 200 forwards these request to the business logic layer 300, as described hereinafter, for additional processing. In addition, the application logic layer 200 utilizes web servers 210, 220, 230 and 240 and policy maintenance application 250. By way of example, web servers 210; 230 and 240 receive requests from the transmit responses to the user interface layer 100 via enterprise server 220. The Application logic layer 200 also includes with user management component 235 for providing access control services which maintain user logins, access control and electronic mail directory information. E-mail component 245 provides mailboxes so that the user interface layer 100 may send and receive e-mail, and also integrates with the user management component 235 for directory services. The policy maintenance application 250 provides correct sequences of the surety system display screens and navigates the user through these screens.

In a preferred embodiment of the present invention, the web servers 210, 20, 230, 240 incorporate a Netscape Enterprise Server™ 220 running in two modes: unsecured mode (HTTP for example) and secured mode (HTTPS for example). Preferably, unsecured server functionality is used only in very limited situations, such as when a user is first logging onto the system 10 or requires access to help screens, using a device 110 as has been discussed with regard to user interface layer 100, for example. Secure server functionality supports encrypted transmission with the user, preventing unauthorized parties from obtaining knowledge of the system processing or policy holder information. Directly accessible via the Internet for example, the web servers 210, 220, 230, 240 are the primary interfaces for users/agents submitting requests to the system 10 via the user interface layer 100, e.g. using devices 110. Whether a request is to rate a new policy, change an endorsement, or generate a completed bond form for example, the web servers 210, 220, 230, 240 respond to requests submitted through a user's browser running on a device 110. While the servers 210, 220, 230, 240 do not implement the key business functions required for operation of the system 10 according to an aspect of the present invention, they do route these requests appropriately as is well understood. The server 220 preferably includes an unsecured directory 222 accessible via the unsecured mode and a secured directory 224 accessible via the secured mode.

The user management component 235 operates in tandem with web server 230, and with electronic mail component 245 respectively operating in tandem with web server 240, and with the policy maintenance application 250, to authenticate users and to control access through restricted system 10 functionality. This component 235 provides the capabilities to define user roles. For example, user roles can be created to differentiate Account Service Representatives (ASRs) from producers, e.g. agents. The user management component 235 also preferably provides a directory for the email component 245. This directory identifies an e-mail box location for each user.

Electronic mail component 245 serves to enable users to exchange email messages within the insurance underwriting system 10 of the present invention, in conjunction with Netscape Messaging Server™ 240. It also provides the ability to send e-mail directly from the system 10 for example, for an agent to contact the insurance underwriter with a question by clicking on an appropriate icon on the screen with the aforementioned agent's mouse or other suitable pointing device coupled to the device 110 as is well understood.

Systems management and monitoring component 215 operates in tandem with web server 210 and provides a system operator with conventional tools for determining whether the system 10 is running smoothly, by analyzing diagnostic information for servers 210, 220, 230, 240. Using a set of visual clues to indicate warnings and trouble signs, a system operator, or administrator, can quickly determine whether a problem exists and diagnose potential causes.

The policy maintenance application 250 preferably contains application logic for displaying a navigating screen on a device 110 and hence to a user, including those specific to a Piece Of Business (POB) such as a particular fidelity policy or surety bond that the agent has prepared. The policy maintenance application 250 applies basic logic and validations, as in the case of determining whether all underwriter questions have been answered in the affirmative. Thus, the policy maintenance application 250 of the system 10 supports activities such as fidelity and surety bond issuance, policy changes, endorsement, cancellations and acceptance processing. While the policy management application 250 contains the logic for managing these user interactions, the business logic layer 300 preferably provides more computational and resource intensive services.

The business logic layer 300 provides functions that require more intensive computer processing resources than application logic layer 200, and which may also require substantial scalability of the computing platform. The business logic layer 300 works closely with the application logic layer 200, with the result being that major fidelity and surety bond functions of the system 10 according to the preferred form of the present invention are provided by the two layers 200, 300 working in combination. In general, if a user request is relatively simple in nature, it is handled directly by the application logic layer 200. However, the business logic layer 300 handles requests that require complex logic, extensive computations or intensive database accesses, for example. Thus, the business logic layer 300 preferably employs technologies that are efficient and precise for the software engineering of more complex algorithms. The business logic layer 300 preferably includes transaction processor 310, form select server 320, forms rendering server 330, rating and premium calculation engine 340 and automatic renewal application 350.

The transaction processor 310 transfers requests between business logic layer 300 components and the application logic layer 200. Requests for functions in the business logic layer 300 are sent through the transaction processor 310. Much like the web servers 210, 220, 230, 240 for example, the transaction processor 310 does not directly perform business calculations or implement applicable business rules, but rather routes those tasks to the other components in the business logic layer 300 for more efficient processing. Preferably, commercially available software commonly known as TUX-EDO is used for this processing. This allows each component to be monitored, and if one should fail, to automatically send a notification to the appropriate technical staff and automatically restart that component. TUXEDO, as used herein, is a commercially available transaction processing application available from BEA SYSTEMS.

The forms select server 320 provides the ability to search the bond forms library 410 for an appropriate set of bond forms based on identified selection criteria. The policy maintenance application 250 collects data from user input, and sends the collected data to the forms select server 320. The bonds form library 410 is queried and searched for appropriate bond forms based upon the input criteria. The forms select server 320 implements the mechanism to select either one or more bond forms from a list of bond forms that match the selection criteria.

The forms rendering server 330 provides functions to automatically "fill out" a bond form identified from the bond library 410 by the server 320. The policy maintenance application 250 passes the bond form name and information to the forms rendering server 330, which in turn generates the information required to fill out the input fields on the retrieved bond form. When complete, the retrieved bond form and the data for the bond form are returned to the policy maintenance application 250, which sends this information to the user interface layer 100 so that the retrieved bond form including relevant data can be displayed or printed using a device 110. During operation of automatic renewal application 350, the forms render server 330 can be used to fill out a bond form in a batch cycle without requiring the agent to again input identical information.

The rating and premium calculation engine 340 executes logic and calculations required to rate policies and generate premiums. This component 340 implements business rules defined in suitable rating spreadsheets for example. The policy maintenance application 250 sends rating variables to the rating and premium calculation engine 340 and the engine 340 returns the results of the calculation back to the policy maintenance application 250.

The automatic renewal application 350 is responsible for automatically renewing policies. The automatic renewal process is scheduled to run at periodic intervals (such as nightly or weekly) by a systems administrator. Preferably automatic renewal will, according to automatic renewal selection criteria, select policies that are eligible for renewal in an upcoming time frame using conventional business logic. The automatic renewal application 350 then processes the renewal for the policies, calling upon the rating and premium calculation engine 340 as has been discussed. Additionally, the automatic renewal application 350 calls for the forms rendering server 330 to fill out the appropriate bond form and print it on a network printer coupled to the system 10, for example. The automatic renewal application 350 has three outputs: a renew list of particular Pieces Of Business (POBS) that have been renewed; an underwriting list of particular Pieces Of Business (POBS) that require attention by the underwriter; and, an exception list which lists those policies which were not renewed due to an exception that occurred during processing.

The fourth layer, the data management layer 400, provides services for restoring and retrieving information from the insurance underwriting system 10 of the present invention. Using the combination of preferably two databases, one for the forms library 410 and the other for the policy data 420, the data management layer 400 services requests for information from the policy management application 250 as well as the business logic layer 300. Additionally, data conversion processes 440 use the data management layer 400 to store converted information from legacy systems, e.g. remapped provided data. Finally, batch programs 430 integrate the databases with external systems such as those described above.

The forms library 410 preferably provides a repository for storing images of bond forms for the underwriter and other sureties. The forms library 410 preferably maintains different versions of the same form, as forms tend to evolve and change over time, and services requests from other system components to retrieve bond forms from the library 410. In addition to storing the actual bond form images, the library 410 also maintains information describing where on particular bond forms input fields are located. The forms rendering engine 330 in the business logic layer 300 uses this information to electronically fill out a bond form retrieved from the library 410 with data provided by policy database 420.

The policy database 420 manages particular business data for active and historic policies stored using the system 10 of the present invention. The policy database 420 services requests from other system components to retrieve and store information reliably.

The external systems interfaces 430 send and receive data to and from other processing systems. In a preferred embodiment, the interfaces 430 send data to the NPPS and TABS systems, and receive data from the CAPIS system. In batch mode, the present system 10 extracts Piece Of Business (POB) information from the policy database 420, maps the extracted data according to a provided specification, and sends the data to the external interfaces 430 for processing, e.g. by NPPS or TABS systems for example. Similarly, the system 10 according to the present invention receives a file from CAPIS, formats it according to the layout of the policy database 420 and imports it into the policy database 420.

Data conversion 440 refers to the process of transferring data from legacy systems into the present system 10 to enable processing of existing policies by the system 10.

Figure 2:
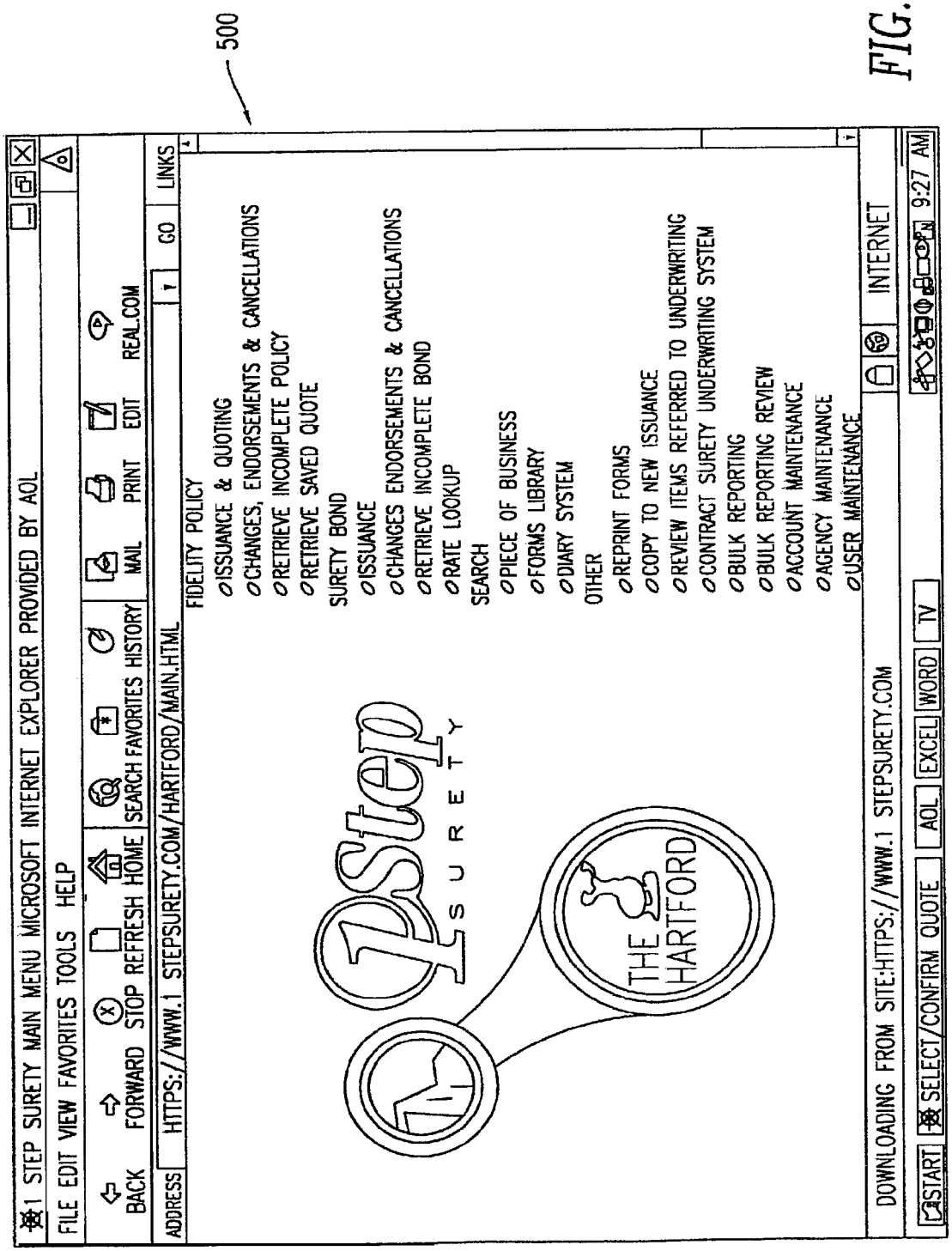
FIG. 2 is a screen display of a main menu screen for issuing an insurance underwriting instrument according to an aspect of the present invention.
Figure 9:
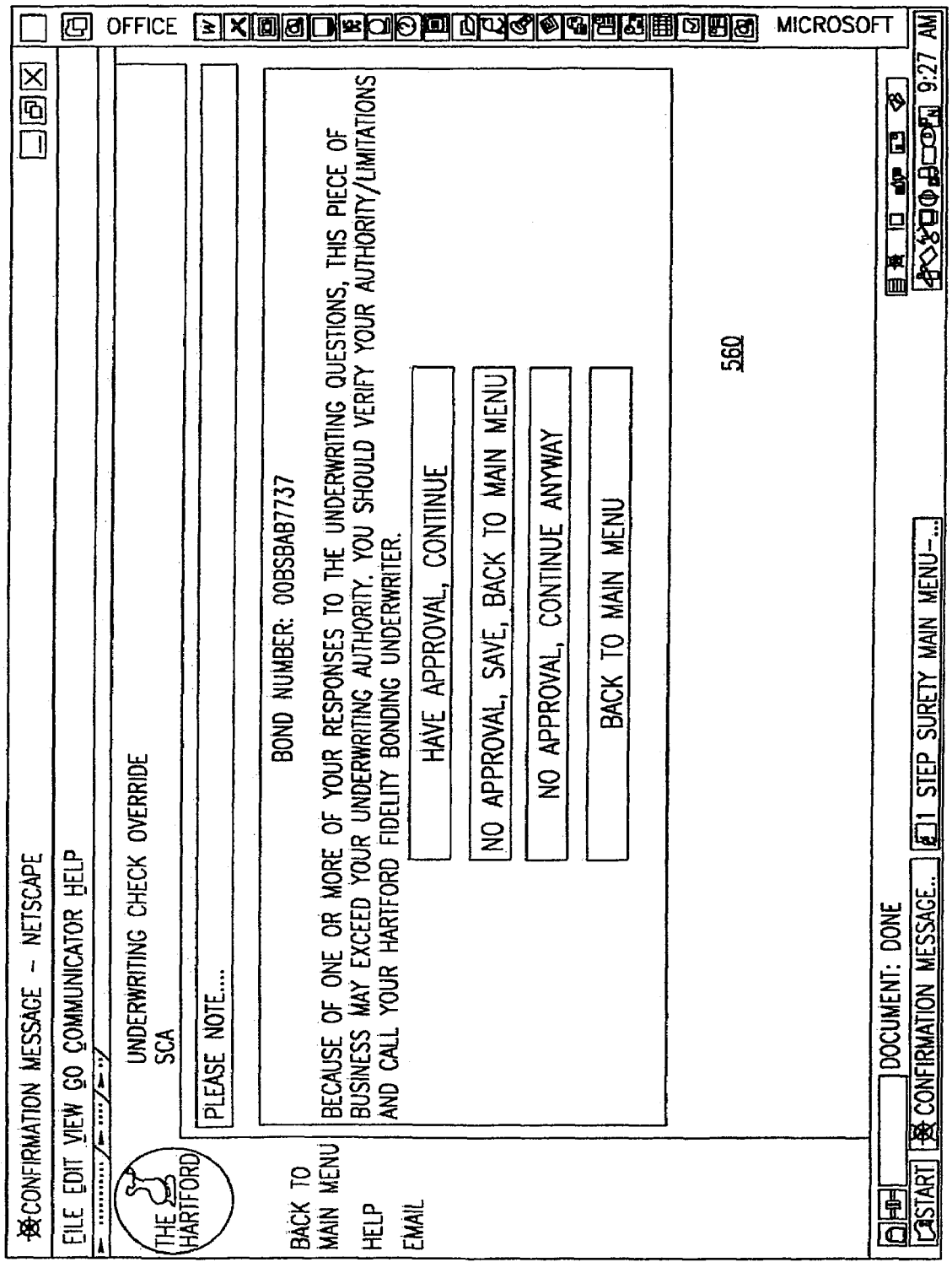
FIG. 9 illustrates an underwriting check override screen according to an aspect of the present invention.

Referring now also to FIGS. 2-20, therein is illustrated exemplary user interface screens displayed by the user interface layer 100 using a device 110 for example. When an agent requests access to the system 10, a main menu screen 500, such as is shown in FIG. 2, provides options regarding fidelity policies, or surety bonds forms to the agent or system user. Additionally, the agent or user can select to search the system for existing POBs or blank forms, reprint previously generated forms, copy previous POBs to generate new POBs, review items associated with that agent or user which were referred to an underwriting department, do bulk report generation, maintain account, user or agency information, allocate blocks of bonds or get general help information.

Referring now also to FIG. 3, if, for example, the user selects a surety bond, a second screen 510 such as is illustrated in FIG. 3 is displayed which specifies types of surety bond that can be selected from a second general menu 511. Referring now also to FIGS. 4A and 4B, the system 10 preferably prompts the user to enter basic information regarding the client or policy holder requesting the bond after which the specific type of bond form necessary can be selected using a screen 512. Based upon the information entered, the system 10 provides a screen 515 as shown in FIG. 5, which include list of bond forms 520 based on the type of surety bond entered previously. Further, a user can select to utilize a form selected from the list 520, a form not found in the list 520, or indicate that no form is applicable using data tools 522. Thus, if a form is to be generated by the system 10, a preselected form corresponding to one of the choices identified in list 520 can be chosen, or a user can opt to find a form not found on the list 520 by searching forms library 410 which is stored in the data management layer 400.

Since specific types of forms require specific information to be entered, once a form is selected from the list 520, or otherwise identified, the system 10 prompts for any additional information necessary to complete the surety bond form as is illustrated by screens 530, 540, 550, 560 and 570 shown in FIGS. 6, 7, 5 8, 9 and 10. One of the advantages of the present invention is that the same type of information need not be entered multiple times if it appears on more than one area of the selected form. The system 10 preferably automatically inputs that information into all the spaces in the form or forms requiring that information.

Figure 11:
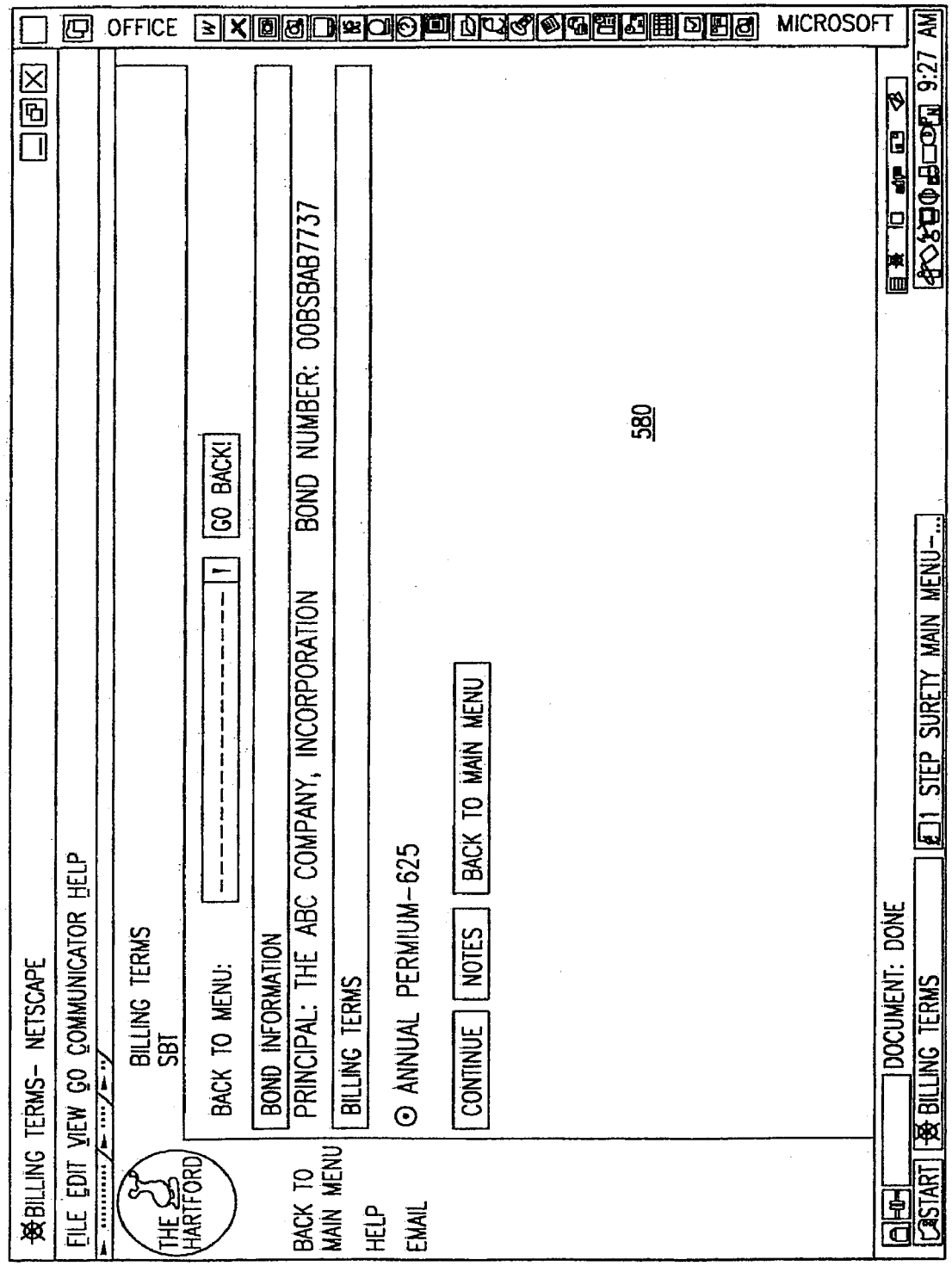
FIG. 11 illustrates a display for communicating calculated billing terms according to an aspect of the present invention.

Referring now also to FIG. 11, after the information required to prepare the bond form is completed, the system 10 provides a quote for underwriting the insurance instrument by automatically calculating the premium and transmitting that information to the agent through the website 200, 300, 400. This is illustrated in FIG. 11 as screen 580.

Figure 12:
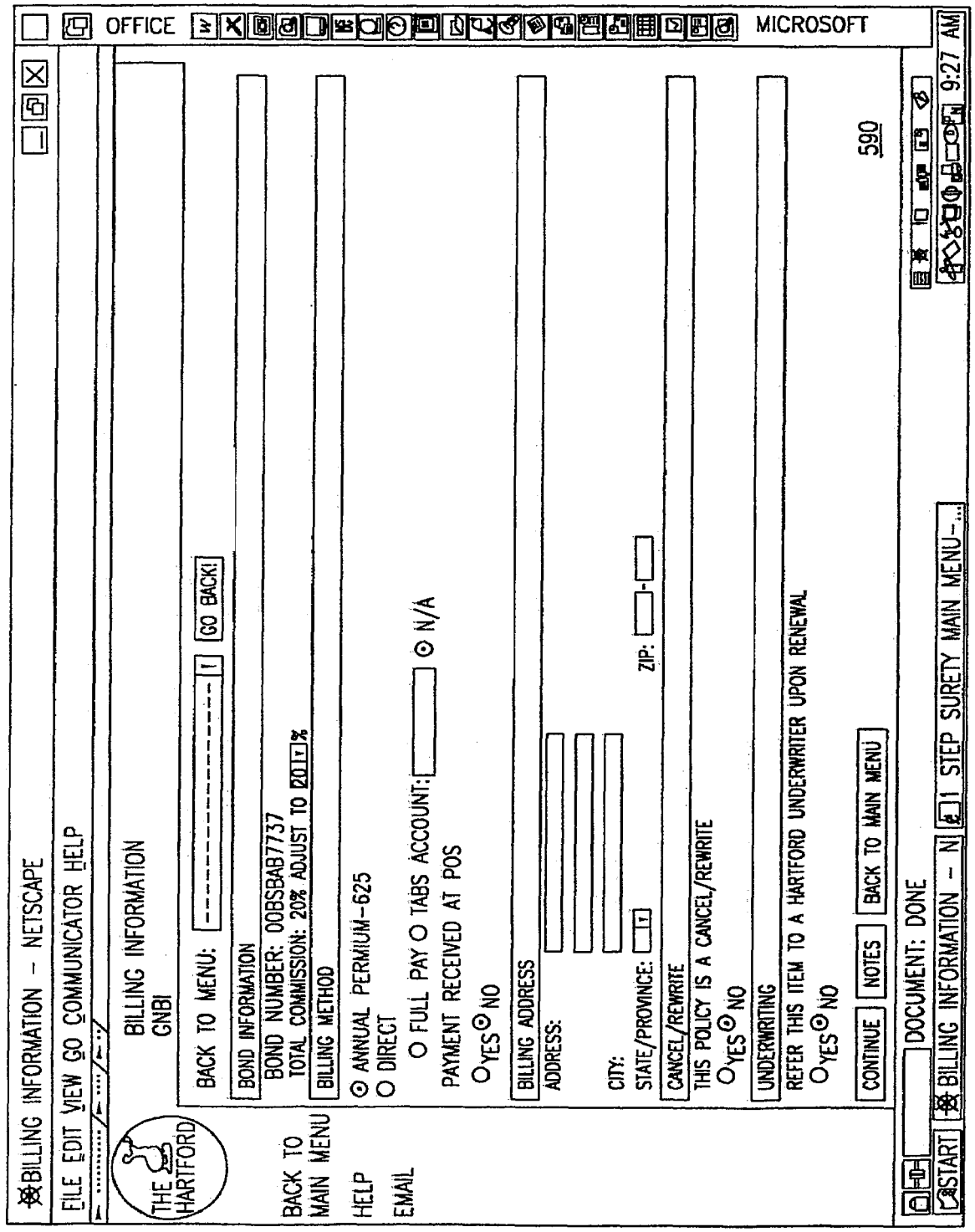
FIG. 12 illustrates a display for inputting billing information for the selected bond according to an aspect of the present invention.
Figure 18D:
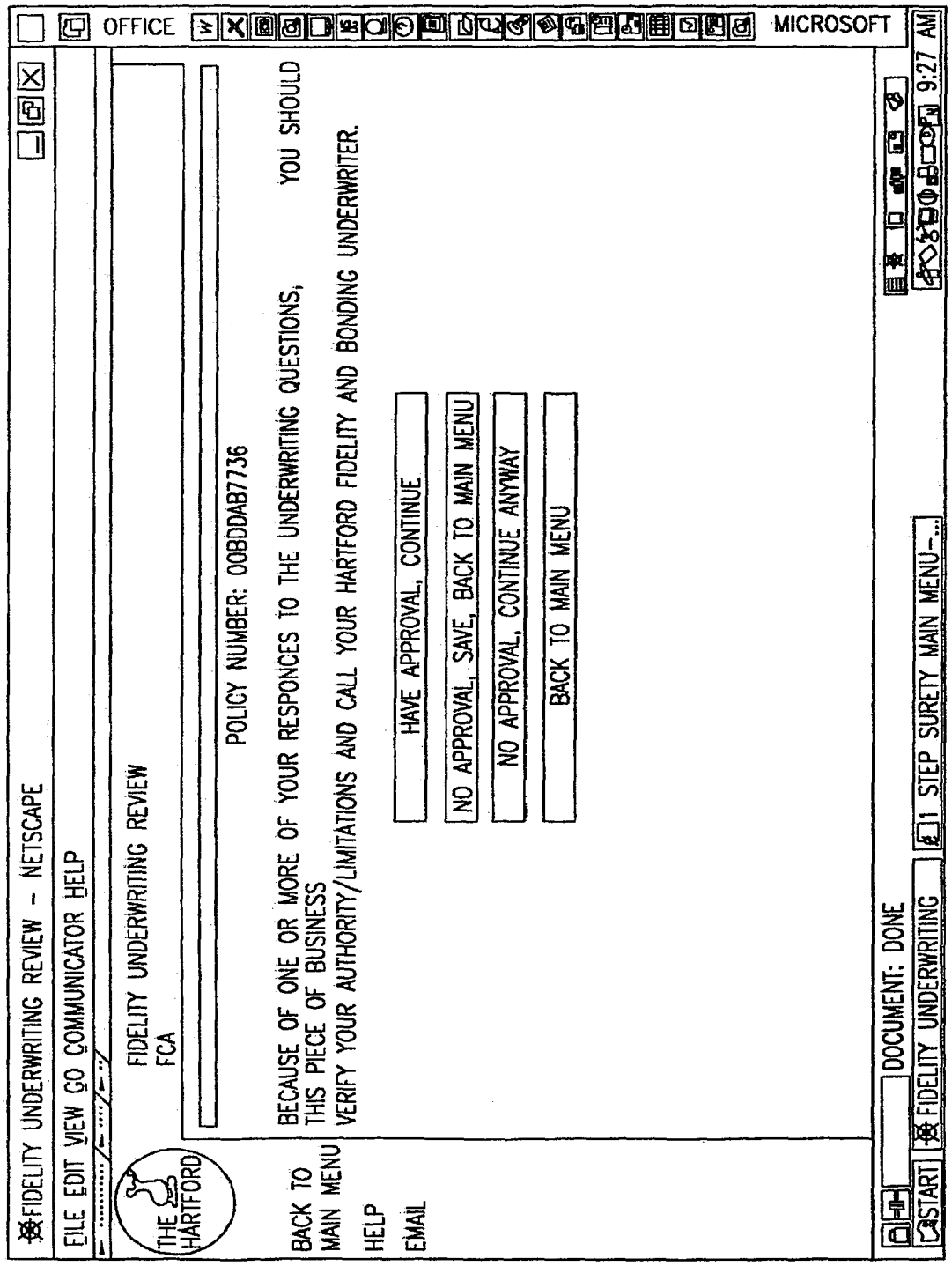
FIG. 18D illustrates a display for performing a fidelity underwriting review according to an aspect of the present invention.

Referring now also to FIG. 12, billing information is entered by the agent using a screen such as that illustrated as 590. Other relevant information that should appear on the printed insurance bond form can then be entered by an agent using a display 600 such as that illustrated in FIG. 13. A notification summary page 610, such as that illustrated in FIG. 14 can be used to provide an agent an opportunity to review each of the required forms for the bond, as well as an opportunity to view them individually or as a group. An exemplary power of attorney, general bond form and invoice such as those identified on screen 610 of FIG. 14 are shown in FIGS. 15, 16 and 17 for sake of completeness.

Figure 19:
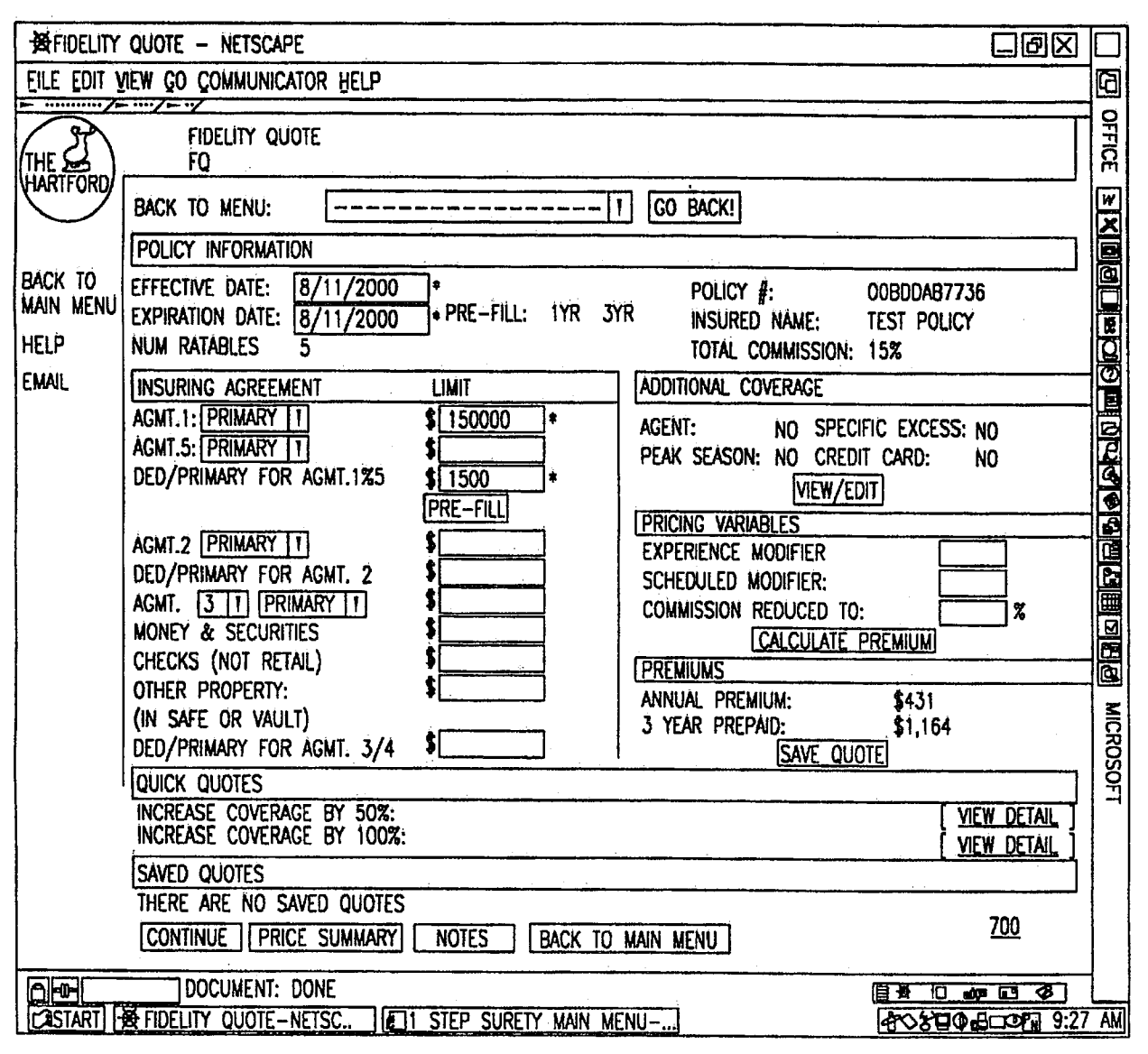

Analogously, in order to quote a different insurance instrument such as a fidelity policy, the system 10 prompts the user to enter basic information and continues in analogous manner as is shown in FIGS. 18A-18D. As shown in FIG. 19, the system 10 then prompts the user for coverage and deductible limits for the insurance instrument to be quoted for the client using a display 700 for example.

Figure 20:
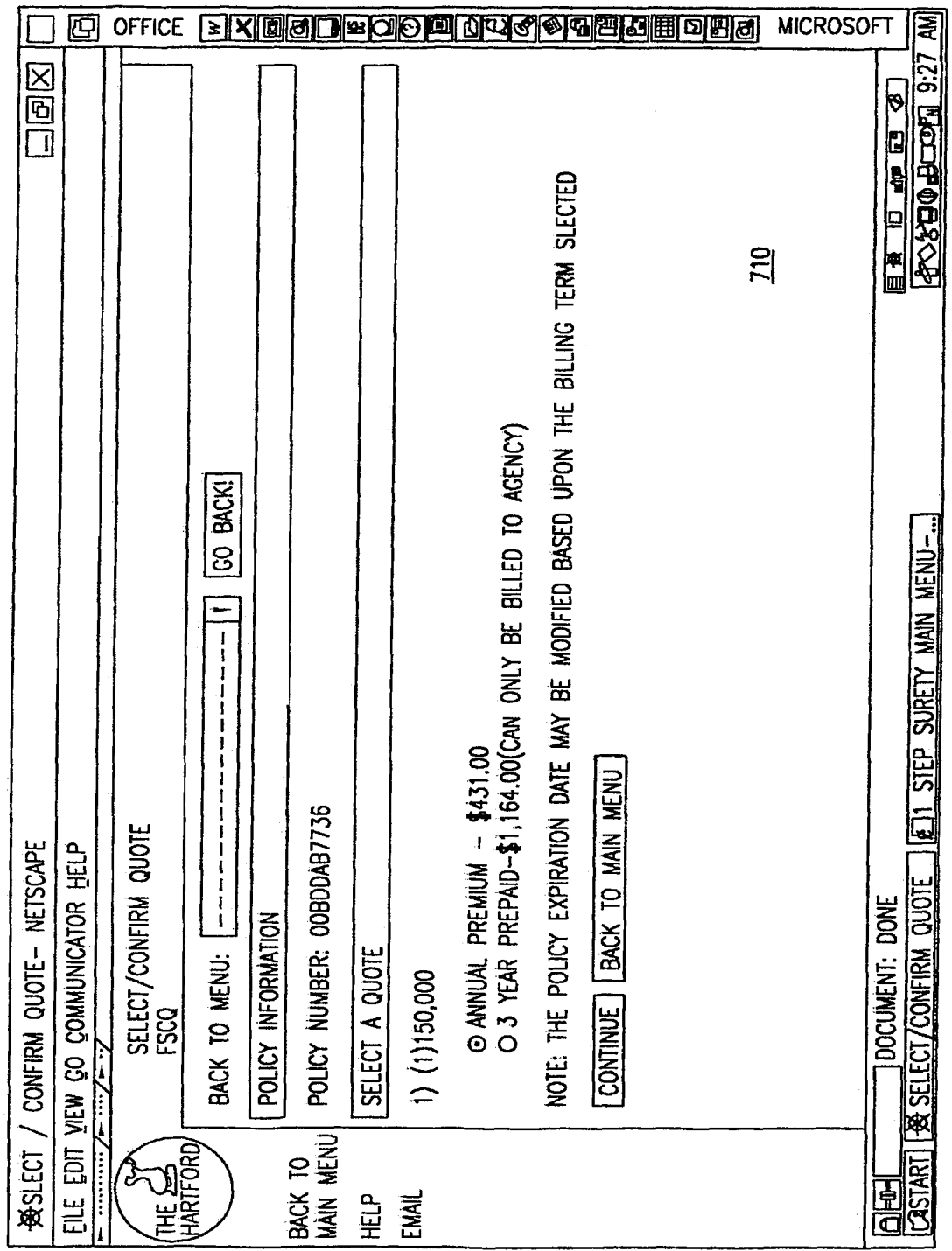
FIG. 20 illustrates a display for selecting and confirming a quote selection for a fidelity policy according to an aspect of the present invention; and, FIG. 21 illustrates a flowchart showing the steps utilized in underwriting a surety bond or fidelity policy according to an aspect of the present invention.

Referring now also to FIG. 20, the premium is then calculated based on the choices entered and the system 10 provides a pricing summary on a screen or display 710 that shows the premium for the fidelity policy, preferably by type of coverage. In a preferred embodiment, the system 10 also offers additional quotes, such as two, at increased gradual limits for the deductible and coverage limits based on the original information provided. This summary can then be used by the agent as a quote to the customer or potential policy holder for providing the fidelity policy.

In the event, for example, that the agent is discussing the policy directly with the customer, such as by telephone or with the customer present at the agent's office, at the time the fidelity information is being entered into the system, the agent can provide the quote directly to the customer who can then either accept or decline that policy. In the event that the client finds the quote acceptable, the agent can immediately issue a fidelity policy. Thus, the agent can continue on with the quote process to complete the booking of the policy and issue that policy to the client without having to wait several business days for a response from the insurance underwriter. If the client is unsure of accepting that policy, the information can be saved in the system for later retrieval by the agent in the event that the client then decides to move forward with the policy, at which time the agent can then continue with the booking and issuance of the fidelity policy without having to re-enter the basic information.

Once the client has selected a particular fidelity policy the system 10 then calculates the premium and the agent can finalize the billing information and terms of the bond instantaneously. For example, a customer may have an account with the agent or the underwriter wherein the customer is automatically charged and an invoice sent, or his or her account can be debited the amount needed for the premium.

Since the completed underwriting forms are stored on the system, an agent can search within the system 10 to find policies which have been issued for particular customers, for example. This is shown in the sample menu screen shown in FIG. 2. An agent can search for a complete list of bonds which have been written by a particular bonding agency, such as the assignee of the present invention, i.e. POBS. Alternatively, the agent can search by a particular bond number to search for that specific bond, by the customer name, as well as other basic information such as the effective date of the bond or the state in which it was issued.

Therefore, according to the present invention, an insurance agent can quickly and easily provide surety bonds and fidelity policies to his customers without having to perform a tedious search for the exact form necessary for that client, while also advantageously eliminating the repetitive information gathering process.

Figure 21:
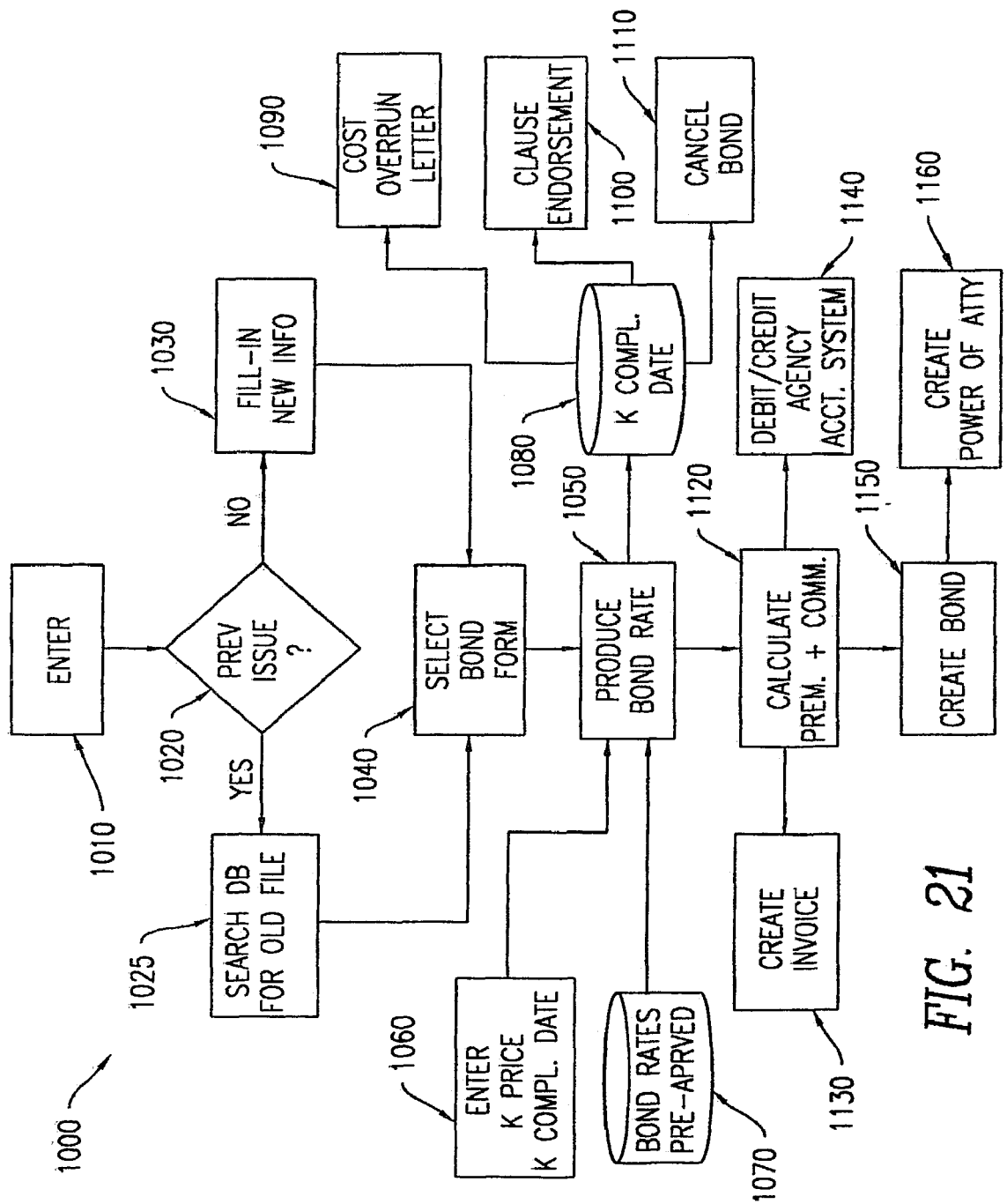

The above steps are shown in a more simplified detail in the flow chart shown in FIG. 21. Once an agent enters 1010 the system 10 using the user interface layer 100 for example, the system 10 inquires if a bond has previously been issued for a particular customer 1020. If yes, the database 420 can be searched 1025 for the basic information about that customer which can then be retrieved, thereby eliminating the need to repeatedly enter the customer information which also reduces the potential for error. Once the customer information is recovered 1025 or otherwise entered 1030, the type of underwriting instrument and the necessary bond form is automatically selected 1040 based thereupon. The agent then enters 1060 other basic information such as contract price and contract completion date if a surety bond is being quoted for example.

When this basic information such as the location of the contract or facility where the fidelity policy is to be issued is entered, the system 10 retrieves 1070 from the database library 420 bond rates which have been established for appropriate geographic areas, e.g. each of the fifty states by zip code. In the next step of the process, the premium is calculated 1050 for that policy, as well as the amount of commission to be paid to the agent 1120 using the ratings calculation engine 340. Once the bond has been finalized and issued, an invoice is submitted to the customer 1130 and/or a credit or debit notice is sent 1140 to the agency's accounting system. After payment has been received electronically for the bond, the bond itself is created 1150 and appropriate supporting documentation, such as a Power of Attorney, are created 1160 such that they are ready for execution by the insurance customer.

Thus, the present invention allows an agent to provide an instant quote on the cost of a fidelity policy or surety bond, while providing a preselected list of coverages normally needed for these types of policies. The system 10 provides for instantaneous issuance and execution of the bond and for the miscellaneous form processing that must be done for each bond, which heretofore had to be done manually. Therefore the present invention allows an agent to price, issue and manage its fidelity insurance and surety bond business in a more efficient manner.

Thus, by using a personal computer or other suitable microprocessor based device 110 in connection over a telecommunication network such as the Internet, an agent can connect to the data processing system 200, 300, 400 (website) for issuing any of a variety of fidelity policies or surety bonds to a customer. The website 200, 300, 400 includes processing abilities necessary for pulling desired forms from the library database 420 stored in the database management layer 400. The agent need only input the data with his or her keyboard or other information input means such as by clicking on different informational categories with a mouse, which information pertains to that client. For example, if client basic information is already stored in the database 40, an agent need only to click on the client's name, and relevant information about that client can be automatically pulled from the database management layer 400. The agent then need only input the specific information regarding a contract for which the surety bond is to be a guarantee, or the type of business that is to be insured by the fidelity policy. The system 10 then calculates the premium payment for that underwriting instrument based on the client data and the contract or business data, and thereby processes this information to issue the bond policy, which policy is then also stored on the website 200, 300, 400.

While specific embodiments of the invention have been described in detail, it will be appreciated by those skilled in the art that various modifications and alterations would be developed in the overall teachings of the disclosures. Accordingly, the particular arrangement discloses are meant to be illustrative only and not limited as to the scope of the invention which is to be given the full breadth of the appended claims and in any and all equivalents thereof.

What is claimed is:

1. A data processing system for issuing a fidelity or surety bond, the system comprising:
   a first plurality of memory locations in one or more data storage devices storing data indicative of images of a plurality of forms, each of said forms being associated with a particular type of fidelity or surety bond;
   a second plurality of memory locations in the one or more data storage devices storing data indicative of policies;
   a user interface generated by the system on a user-accessible device for receiving user-input data indicative of an insurance client and data indicative of the fidelity or surety bond;
   a calculator responsive to data input via said user interface and configured to automatically calculate a premium for the fidelity or surety bond based on the input data using at least one computer processor and data indicative of one of the fidelity or surety bond; and
   wherein selected ones of said plurality of forms are rendered by at least one computer processor in communication with said one or more data storage devices using said data stored in said first and second pluralities of memory locations and calculated premium in response to a request from said user interface.

2. The system of claim 1, wherein said processor is further adapted to select a sub-set of the data indicative of images of a plurality of pre-defined bond forms dependently upon the input data, and automatically render the at least one fidelity or surety bond to be issued using said data indicative of insurance clients, wherein said selected data is indicative of said plurality of images of pre-defined forms using said data stored in said first and second pluralities of memory locations and calculated premium in response to a request from said user interface.

3. The system of claim 2, wherein said user interface comprises a web browser functionality operable on a microprocessor based device.

4. The system of claim 3, wherein said microprocessor based device further provides for viewing and printing said at least one fidelity or surety bond.

5. The system of claim 3, further comprising at least one web server.

6. The system of claim 5, wherein said web server includes a processor providing user account management and providing e-mail services.

7. The system of claim 5, wherein said at least one web server includes a processor validating said input data indicative of the insurance client and said data indicative of the fidelity or surety bond.

8. The system of claim 3 wherein a suitable one of said plurality of forms is rendered using data stored in said first and second pluralities of memory locations and calculated premium in response to data input from said user interface.

9. A computer method for issuing a fidelity or surety bond comprising:
   identifying by a computer processor data stored in a plurality of memory locations in one or more data storage devices in communication with the computer processor and being indicative of a select one of a plurality of customers;
   receiving by the computer processor data indicative of a fidelity or surety bond to be associated with said select customer;
   automatically calculating by the computer processor at least one rate associated with said fidelity or surety bond to be associated with said select customer using said data indicative of said customer and data indicative of said fidelity or surety bond to be associated with said select customer;
   selecting by the computer processor at least one of a plurality of forms for said fidelity or surety bond, data indicative of said plurality of forms being stored in one or more data storage devices in communication with the computer processor, using said data indicative of said fidelity or surety bond to be associated with said select customer; and
   automatically rendering by the computer processor said at least one form using said at least one rate, said data indicative of said customer, and data indicative of said fidelity or surety bond to be associated with said select customer.

10. A data processing system for issuing an insurance underwriting instrument, the system comprising:
   a user interface generated by the data processing system for display on a user device for receiving and transmitting to the data processing system user-entered data indicative of insurance customers and requests for insurance policies and for displaying on the user device data indicative of approved insurance underwriting instruments;
   an application subsystem communicable with said user interface and for managing communications with the user interface;
   a business subsystem communicable with said application subsystem and for automatically calculating premium payments for said entered requests, automatically selecting ones of a plurality of forms, data indicative of the forms being stored in one or more data storage devices of the data processing system, in response to said entered data, and rendering said selected forms; and
   a data management subsystem communicable with said business subsystem and for storing data indicative of images of said plurality of forms and data indicative of one of a fidelity bond or a surety bond,
   the application subsystem, the business subsystem and the data management subsystem being implemented on one or more computer hardware servers in communication with the one or more data storage devices and in communication via a network with the user device.

11. The system of claim 10, wherein said user interface comprises a web browser for providing a browser functionality operable on a microprocessor based device.

12. The system of claim 11, wherein said user interface and application system are communicable with one another via a computer network.

13. The system of claim 11, wherein said microprocessor based device further comprises a processor for viewing and printing said approved insurance instruments.

14. The system of claim 10, wherein said application subsystem comprises at least one web server.

15. The system of claim 14, wherein said at least one web server includes providing user account management and providing e-mail services.

16. The system of claim 14, wherein said at least one web server includes validating said requests for insurance policies.

17. The system of claim 10, wherein the business subsystem comprises a transaction processor for transferring requests between the application subsystem and business subsystem.

18. The system of claim 10, wherein the business subsystem further comprises a first microprocessor based device for selecting ones of said plurality forms in response to said user interface,
 a second microprocessor based device for rendering said selected forms,
 a third microprocessor based device for automatically calculating premiums associated with said entered requests, and
 a processor for automatically renewing existing insurance policies.

19. The system of claim 18, wherein said first microprocessor based device includes a search engine for searching said forms.

20. The system of claim 18, wherein said third microprocessor based device includes a processor for rating policies to be issued.

* * * * *